US012176645B2

(12) United States Patent
Little et al.

(10) Patent No.: US 12,176,645 B2
(45) Date of Patent: Dec. 24, 2024

(54) TERMINAL MODULE AND ELECTRICAL CONNECTOR WITH THE SAME

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Terrance F. Little, Fullerton, CA (US); Patrick R. Casher, North Aurora, IL (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 373 days.

(21) Appl. No.: 17/569,716

(22) Filed: Jan. 6, 2022

(65) Prior Publication Data

US 2022/0216635 A1 Jul. 7, 2022

Related U.S. Application Data

(60) Provisional application No. 63/134,557, filed on Jan. 6, 2021.

(51) Int. Cl.
*H01R 13/405* (2006.01)
*H01R 13/502* (2006.01)

(52) U.S. Cl.
CPC ......... *H01R 13/405* (2013.01); *H01R 13/502* (2013.01)

(58) Field of Classification Search
CPC ............................ H01R 13/405; H01R 13/502
USPC ............................................................ 439/701
See application file for complete search history.

(56) References Cited

U.S. PATENT DOCUMENTS

| | | | | |
|---|---|---|---|---|
| 8,764,460 | B2 | 7/2014 | Smink et al. | |
| 8,764,488 | B2 * | 7/2014 | Zeng | H01R 13/6585 439/108 |
| 9,337,585 | B1 * | 5/2016 | Yang | H01R 13/6583 |
| 9,490,585 | B2 * | 11/2016 | Yang | H01R 13/6585 |

(Continued)

FOREIGN PATENT DOCUMENTS

| | | | | |
|---|---|---|---|---|
| CN | 205863545 U | * | 1/2017 | |
| CN | 105932458 B | * | 7/2018 | H01R 13/02 |

*Primary Examiner* — Peter G Leigh
(74) *Attorney, Agent, or Firm* — Ming Chieh Chang

(57) ABSTRACT

The electrical connector includes a contact module received within an insulative housing. The contact module includes an upper contact unit and a lower contacts unit stacked with each other. Each of the upper contact unit and the lower contact unit includes a front/outer contact part and a rear/inner contact part each including a plurality of side by side arranged contacts integrally formed with a plurality of plastic tie bars at different positions via insert-molding. The contacts include a plurality of differential pair signal contacts and a plurality of grounding contacts alternately arranged with each other along a transverse direction. Each plastic tie bar includes an insulative primary part integrally formed with all contacts via a first insert-molding process, and a conductive secondary part integrally formed with the primary part and the grounding contacts via a second insert-molding process after the first insert-molding process.

17 Claims, 44 Drawing Sheets

(56) References Cited

U.S. PATENT DOCUMENTS

| | | | | |
|---|---|---|---|---|
| 9,496,657 | B1 * | 11/2016 | Chang | H01R 13/6471 |
| 9,653,849 | B2 * | 5/2017 | Hsu | H01R 13/405 |
| 10,367,308 | B2 * | 7/2019 | Little | H01R 12/712 |
| 10,396,513 | B2 | 8/2019 | Regnier | |
| 10,490,920 | B2 * | 11/2019 | Manickam | H01R 13/648 |
| 2018/0090887 | A1 * | 3/2018 | Little | H01R 13/6594 |
| 2019/0052020 | A1 * | 2/2019 | Chen | H01R 13/504 |
| 2019/0131743 | A1 * | 5/2019 | Hsu | H01R 13/405 |
| 2020/0076131 | A1 * | 3/2020 | Hu | H01R 12/737 |
| 2020/0212612 | A1 * | 7/2020 | Yang | H01R 12/62 |

* cited by examiner

TERMINAL MODULE AND ELECTRICAL CONNECTOR WITH THE SAME

BACKGROUND OF THE INVENTION

1. Field of the Invention

The present invention relates generally to an electrical connector having the corresponding contact module equipped with grounding bars. This invention is an improvement to the provisional application 63/053,611 filed on Jul. 18, 2020.

2. Description of Related Art

U.S. Pat. No. 8,764,460, issued on Jul. 1, 2014, discloses an electrical connector having a first row of contact pins. The first row of contact pins comprises a first grounding pin, a second grounding pin, and a first signal pin arranged between the first grounding pin and the second grounding pin. A grounding bar electrically connects the first grounding pin and the second grounding pin. The grounding bar and the grounding pin are an integral structure which will waste more materials during manufacturing.

An improved electrical device is desired.

SUMMARY OF THE INVENTION

The electrical connector includes a contact module received within an insulative housing. The contact module includes an upper contact unit and a lower contacts unit stacked with each other. Each of the upper contact unit and the lower contact unit includes a front/outer contact part and a rear/inner contact part each including a plurality of side by side arranged contacts integrally formed with a plurality of plastic tie bars at different positions via insert-molding. The contacts include a plurality of differential pair signal contacts and a plurality of grounding contacts alternately arranged with each other along a transverse direction. Each plastic tie bar includes an insulative primary part integrally formed with all contacts via a first insert-molding process, and a conductive secondary part integrally formed with the primary part and the grounding contacts via a second insert-molding process after the first insert-molding process.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1A:
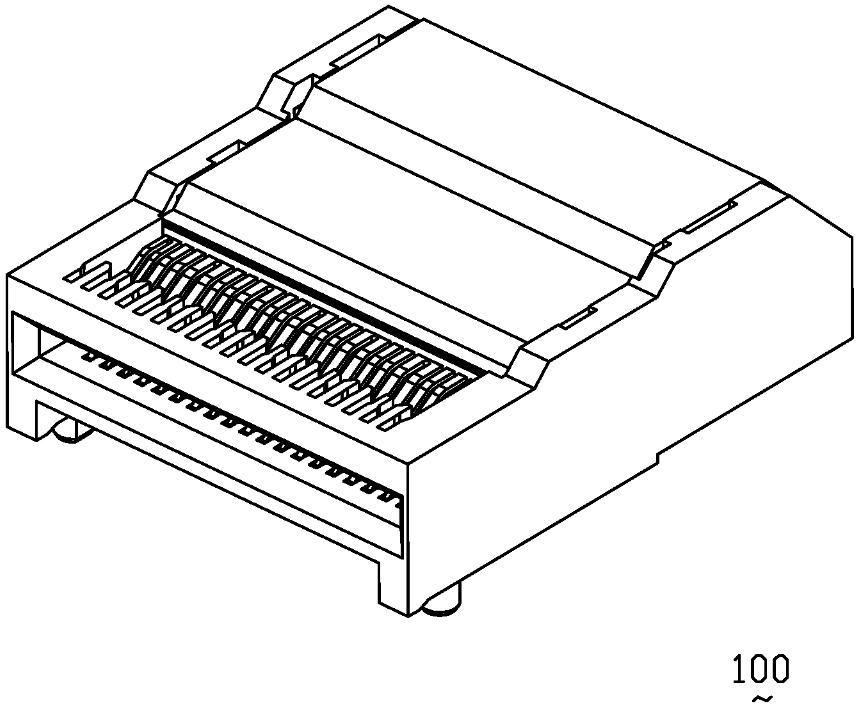
FIG. 1(A) is a perspective view front of an electrical connector according to a first embodiment of the first invention.
Figure 1B:
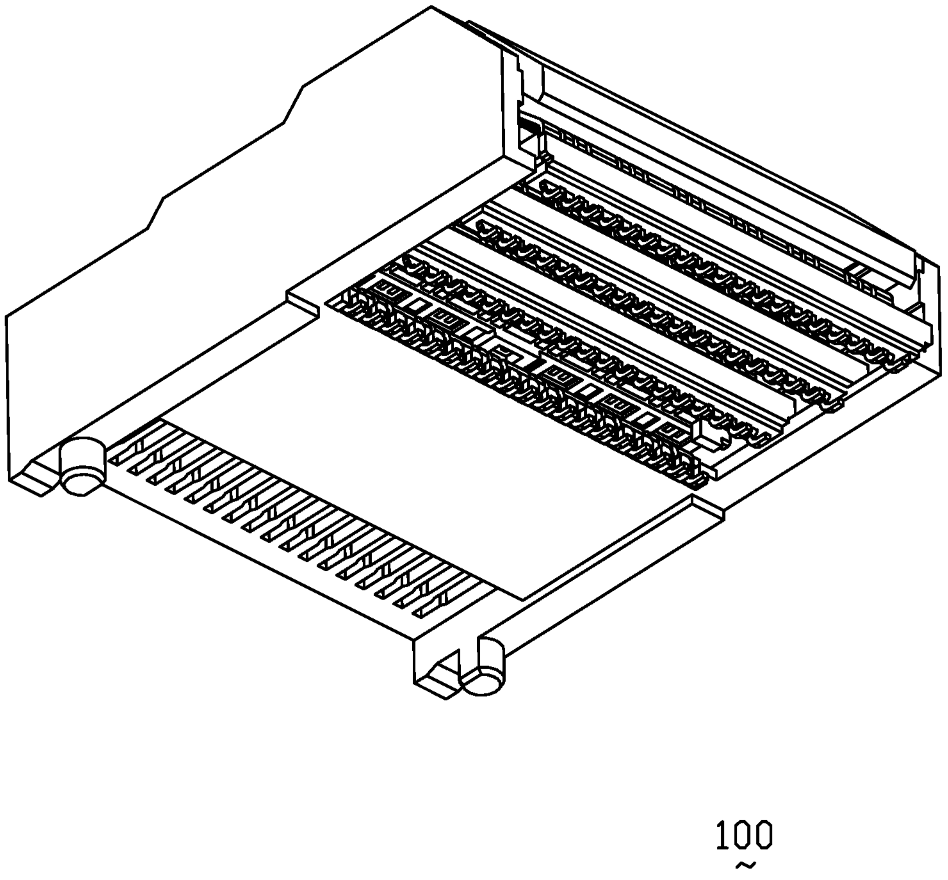
FIG. 1(B) is another perspective view of the electrical connector of FIG. 1(A)
Figure 2A:
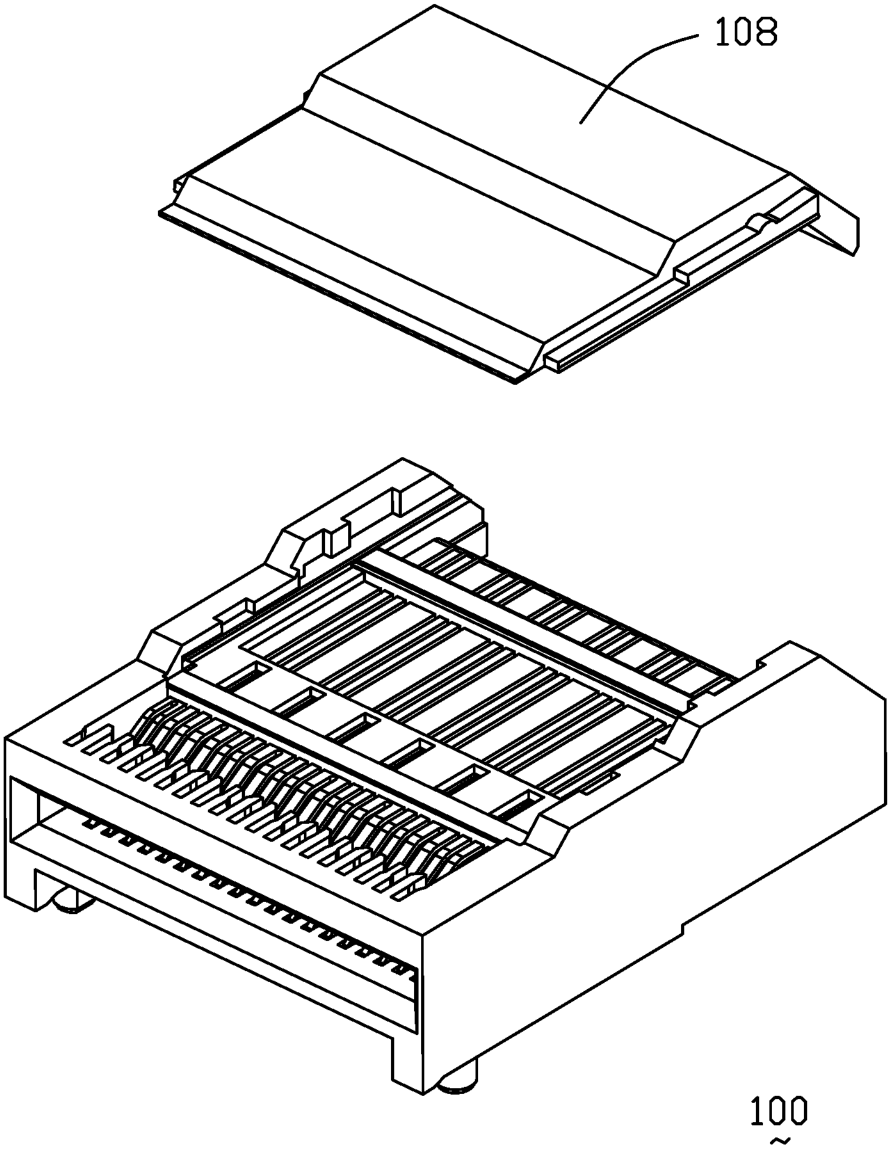
FIG. 2(A) is an exploded perspective view of the electrical connector of FIG. 1(A)
Figure 2B:
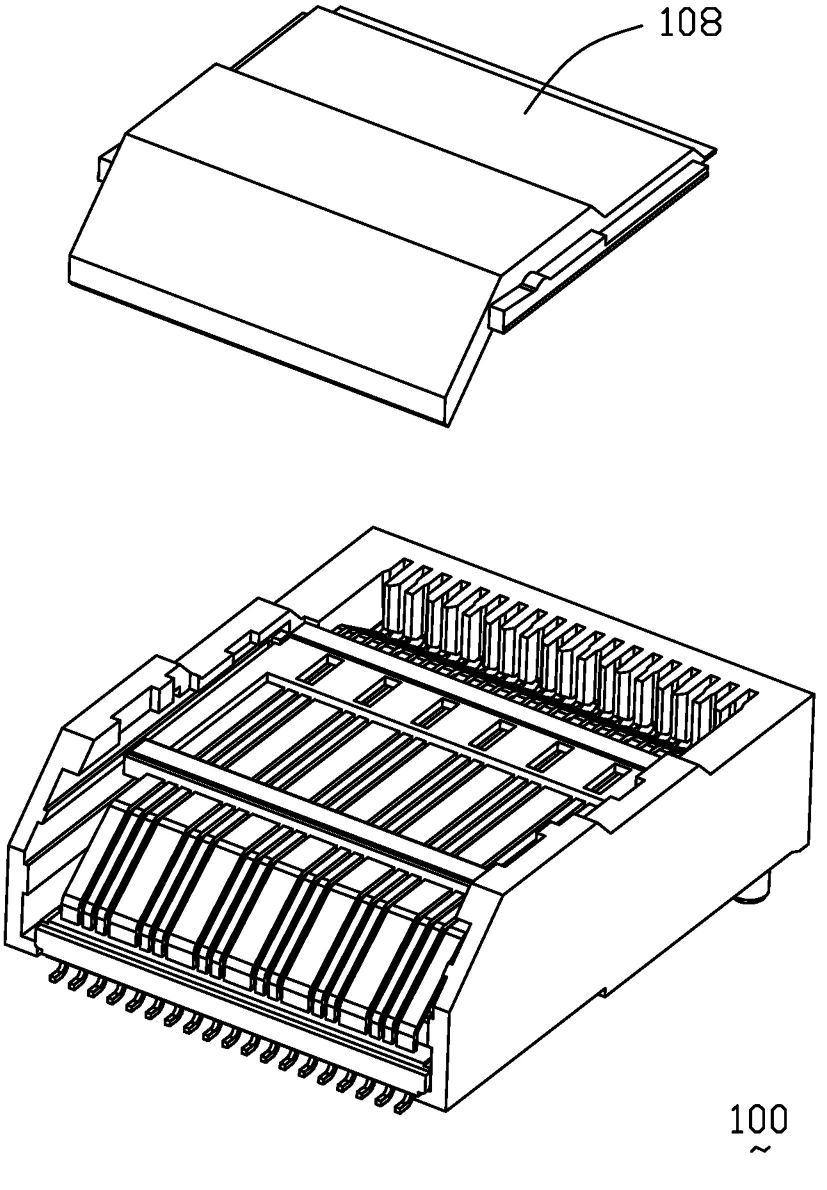
FIG. 2(B) is another exploded perspective view of the electrical connector of FIG. 2(A)
Figure 3A:
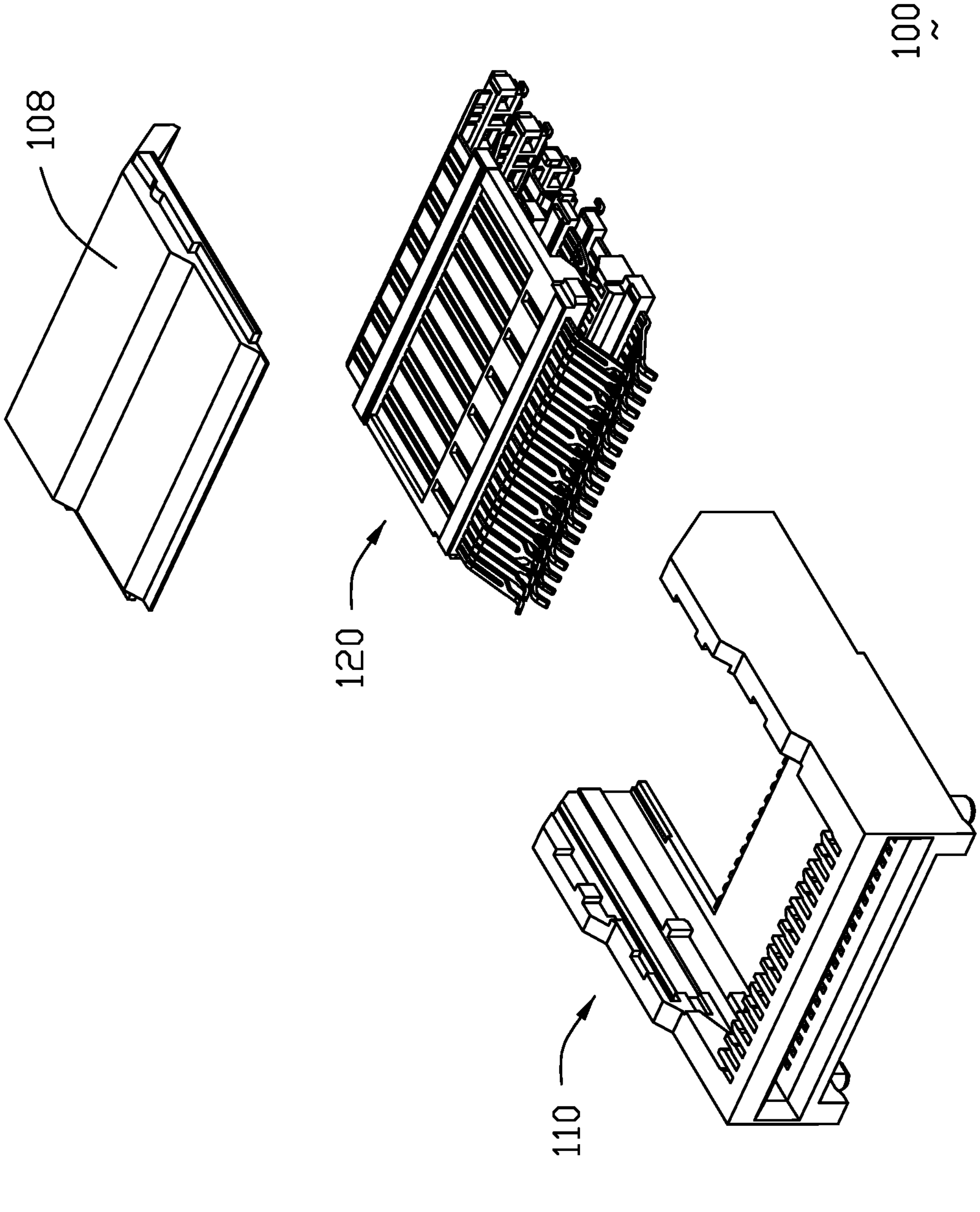
FIG. 3(A) is a further exploded perspective view of the electrical connector of FIG. 2(A)
Figure 3B:
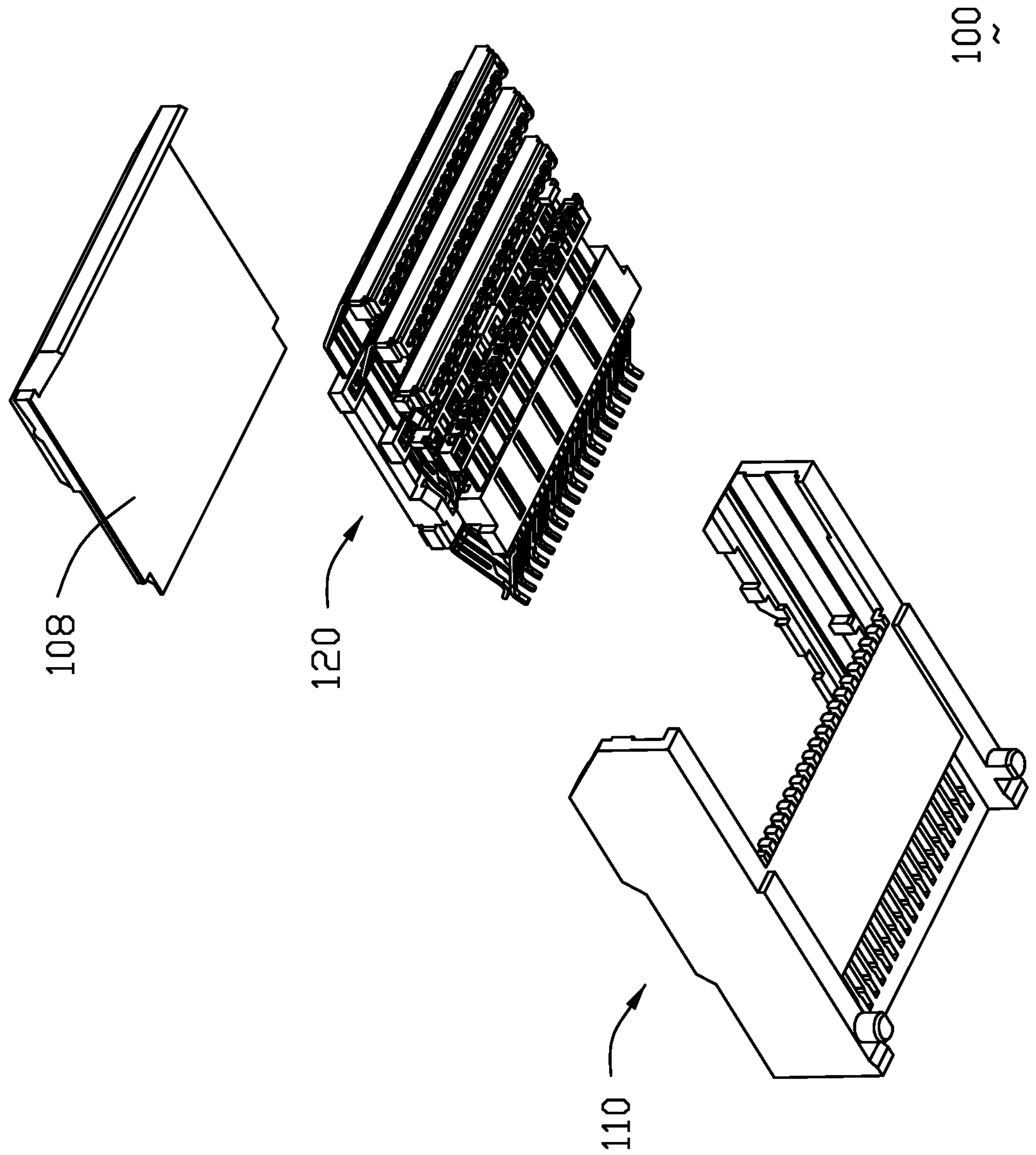
FIG. 3(B) is another exploded perspective view of the electrical connector of FIG. 3(A)
Figure 4A:
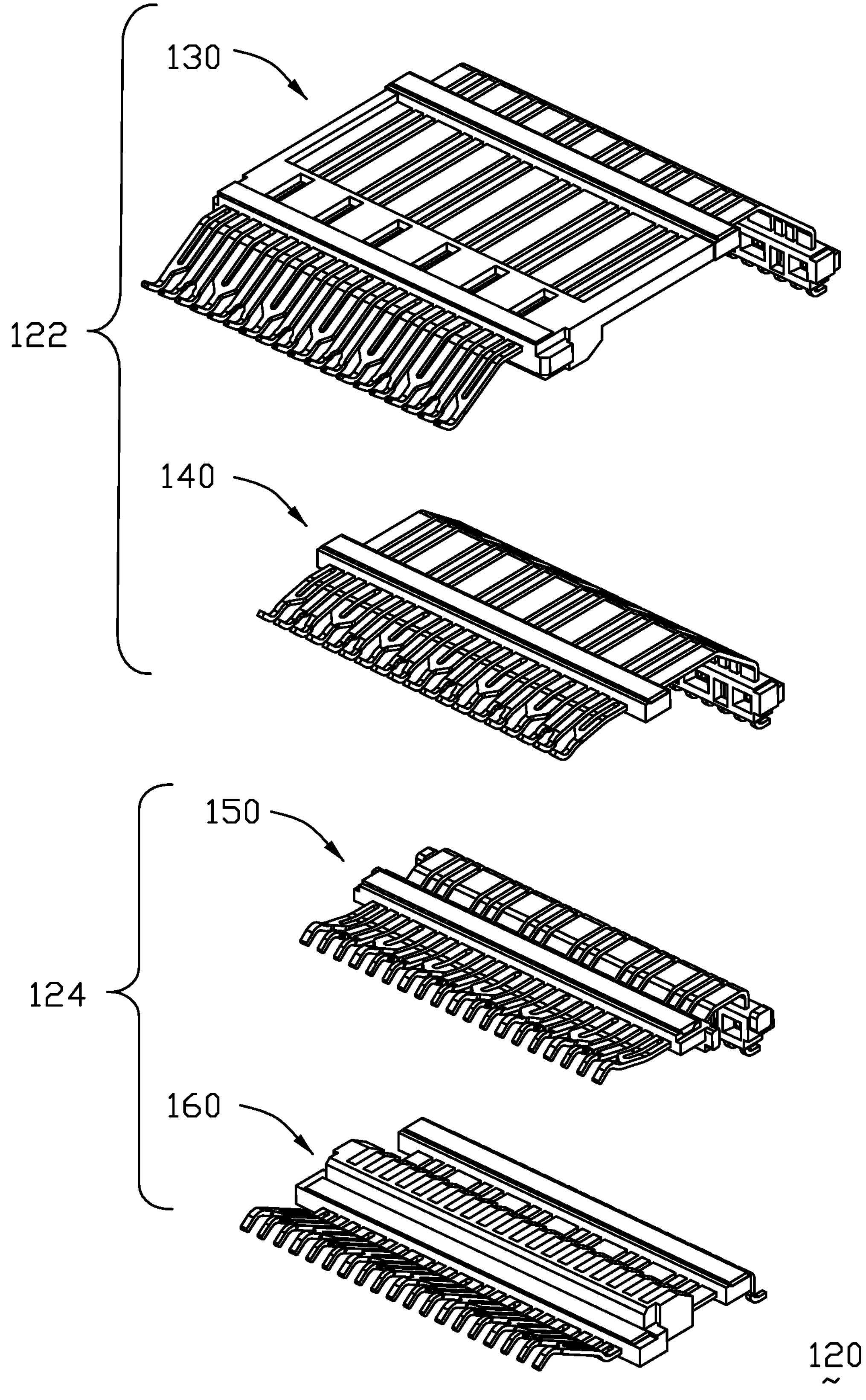
FIG. 4(A) is an exploded perspective view of the contact module of the electrical connector of FIG. 3(A)
Figure 4B:
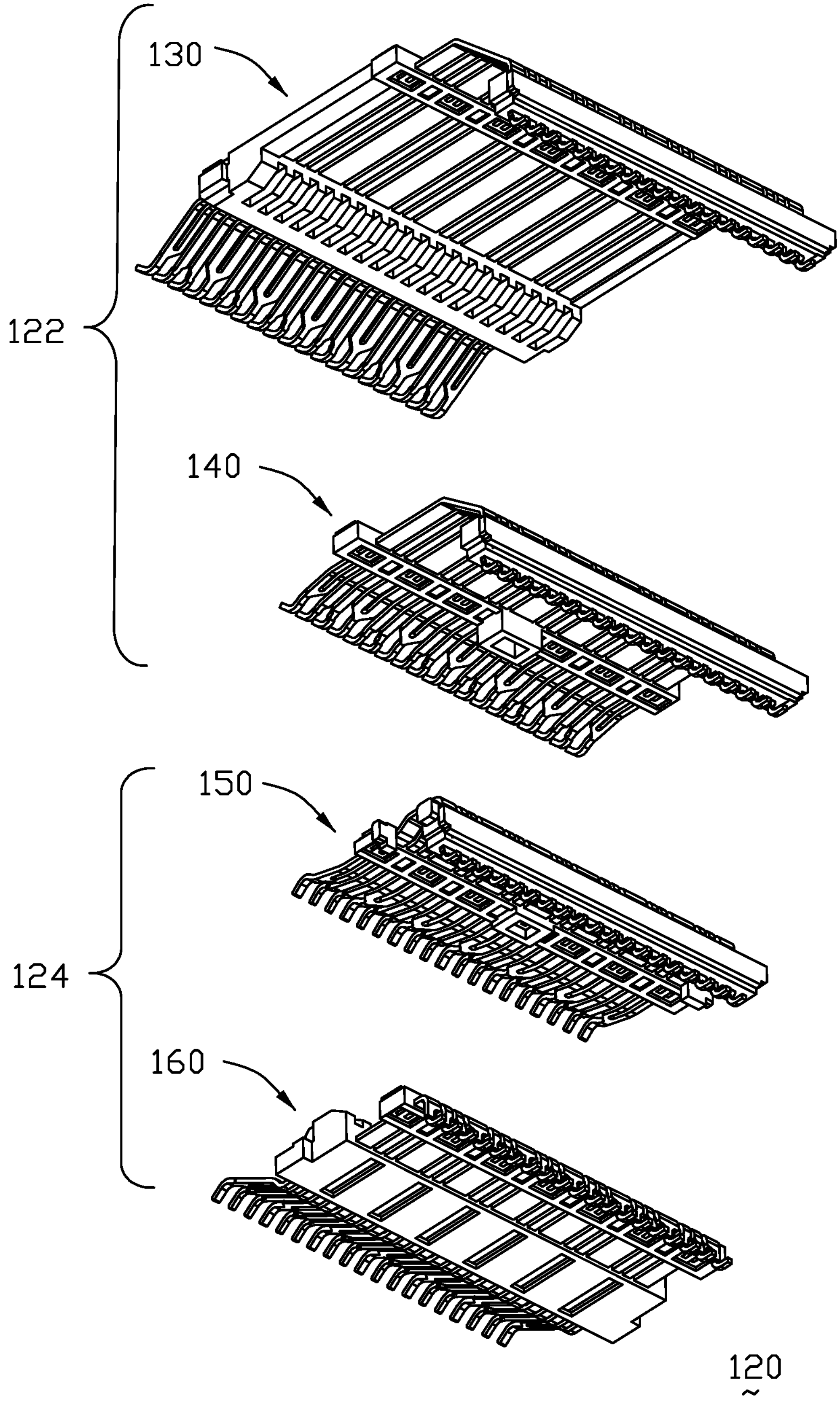
FIG. 4(B) is another exploded perspective view of the contact module of the electrical connector of FIG. 4(A)
Figure 5A:
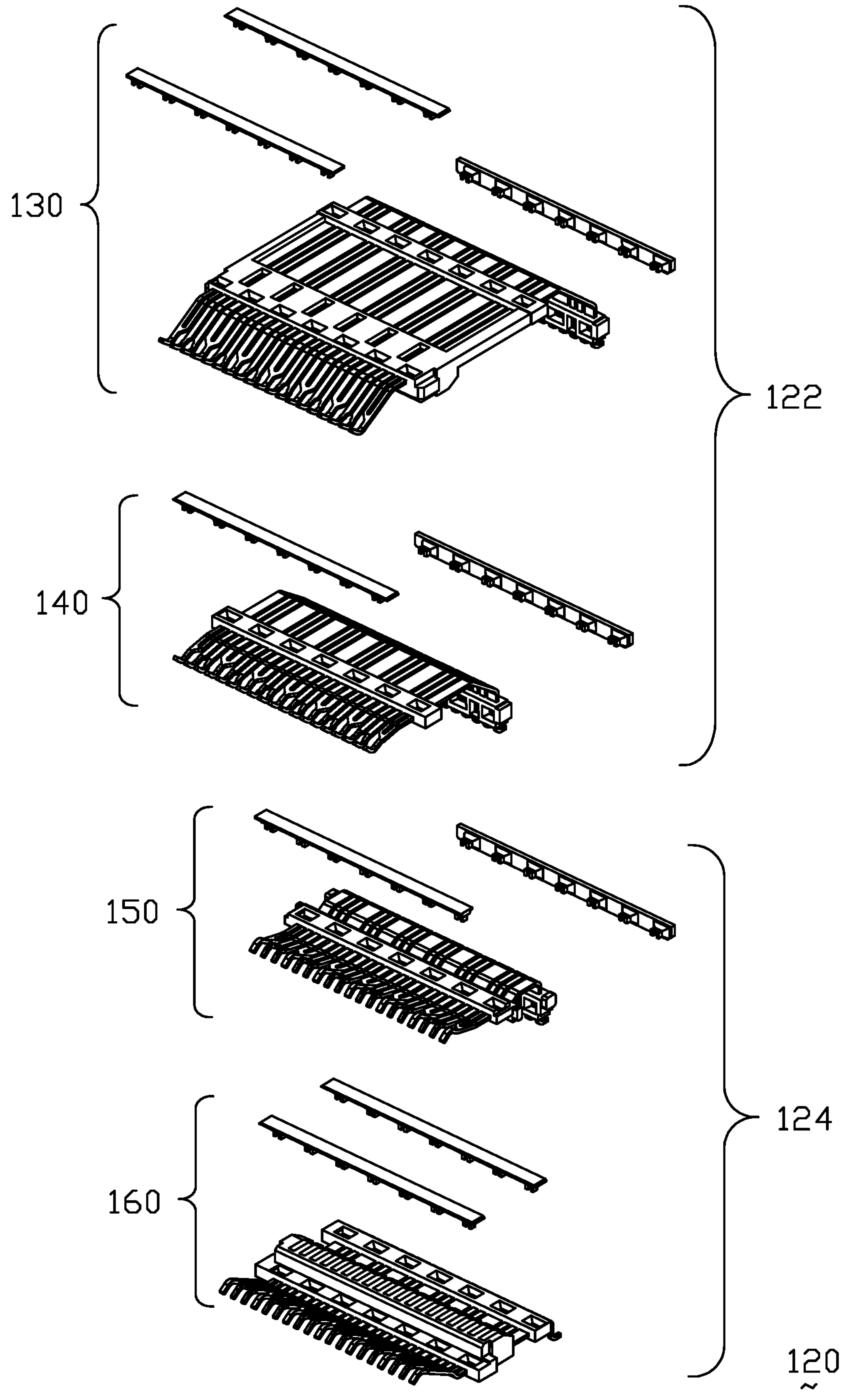
FIG. 5(A) is a further exploded perspective view of the contact module of the electrical connector of FIG. 4(A)
Figure 5B:
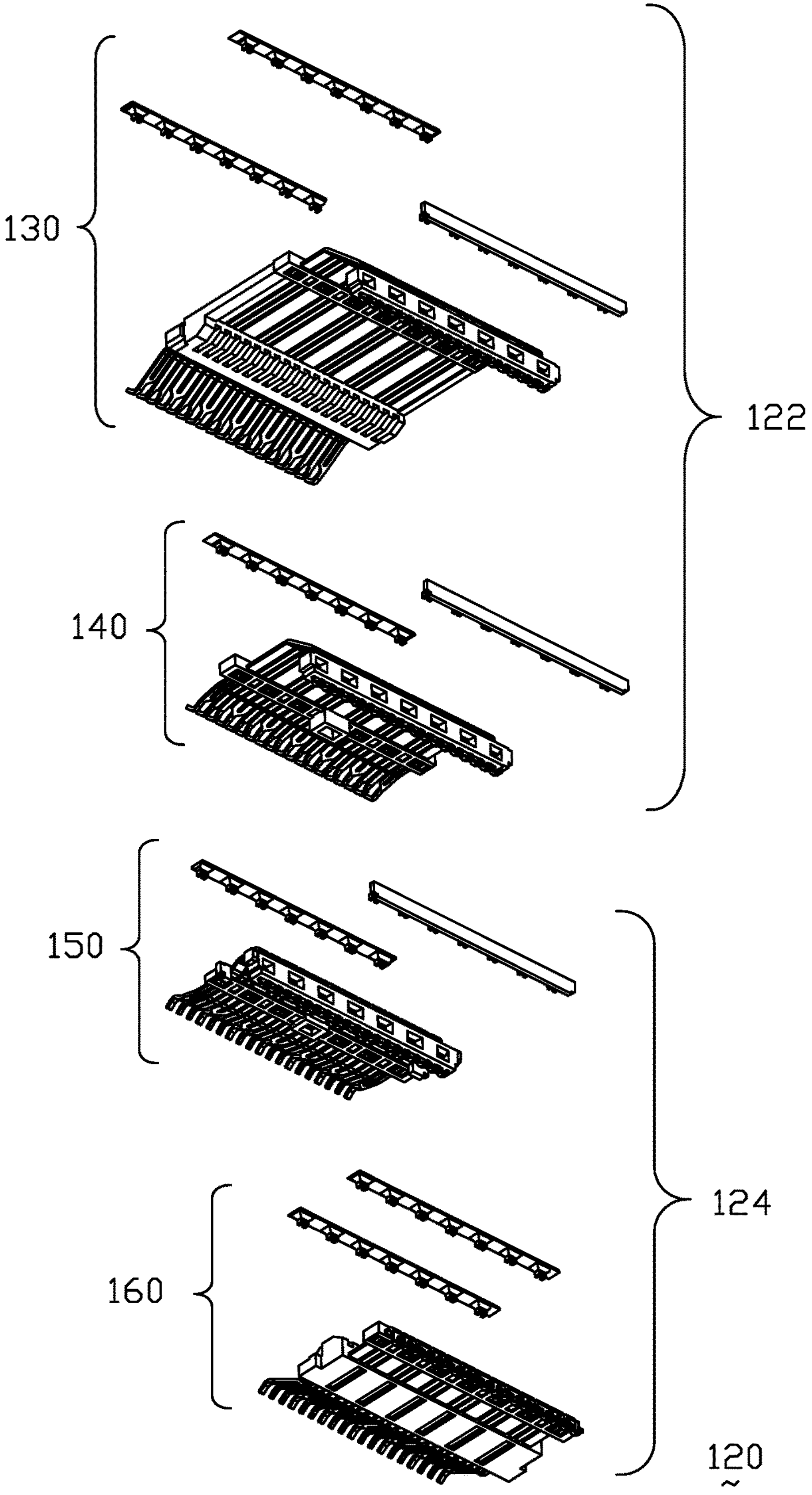
FIG. 5(B) is another exploded perspective view of the contact module of the electrical connector of FIG. 5(A)
Figure 6A:
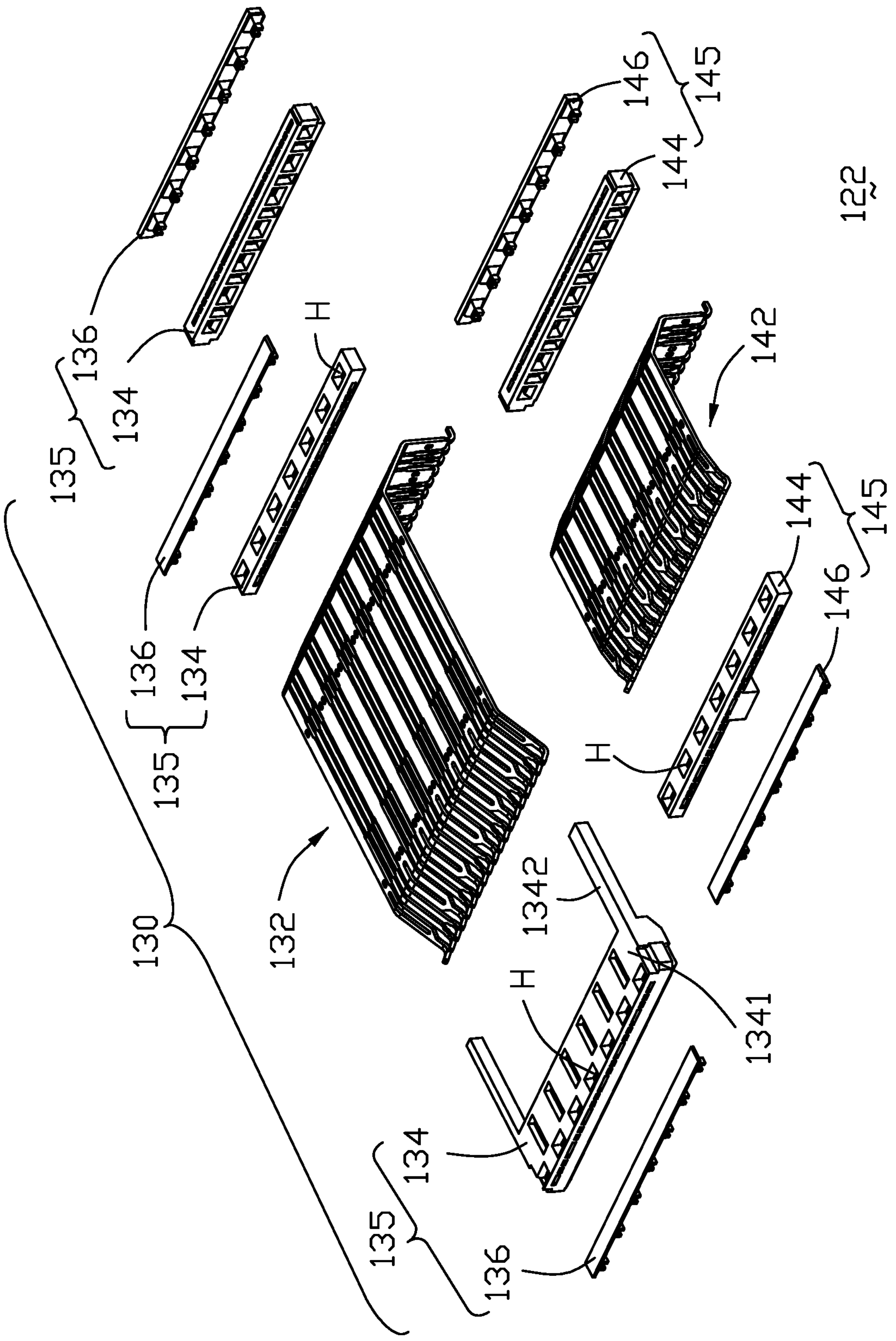
FIG. 6(A) is an exploded perspective view of the upper contact unit of the contact module of the electrical connector of FIG. 5(A)
Figure 6B:
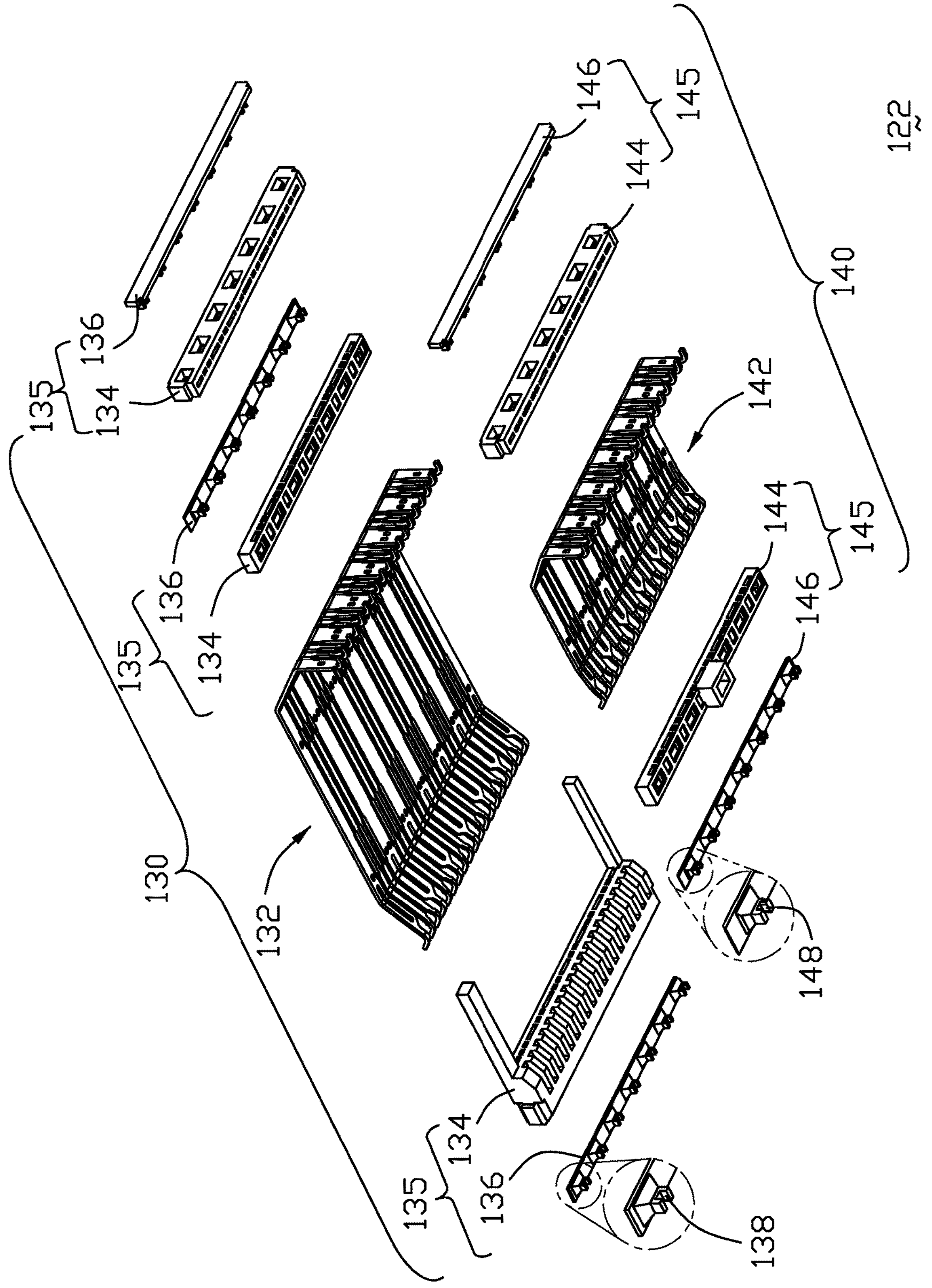
FIG. 6(B) is another exploded perspective view of the upper contact module of the electrical connector of FIG. 6(A)
Figure 7A:
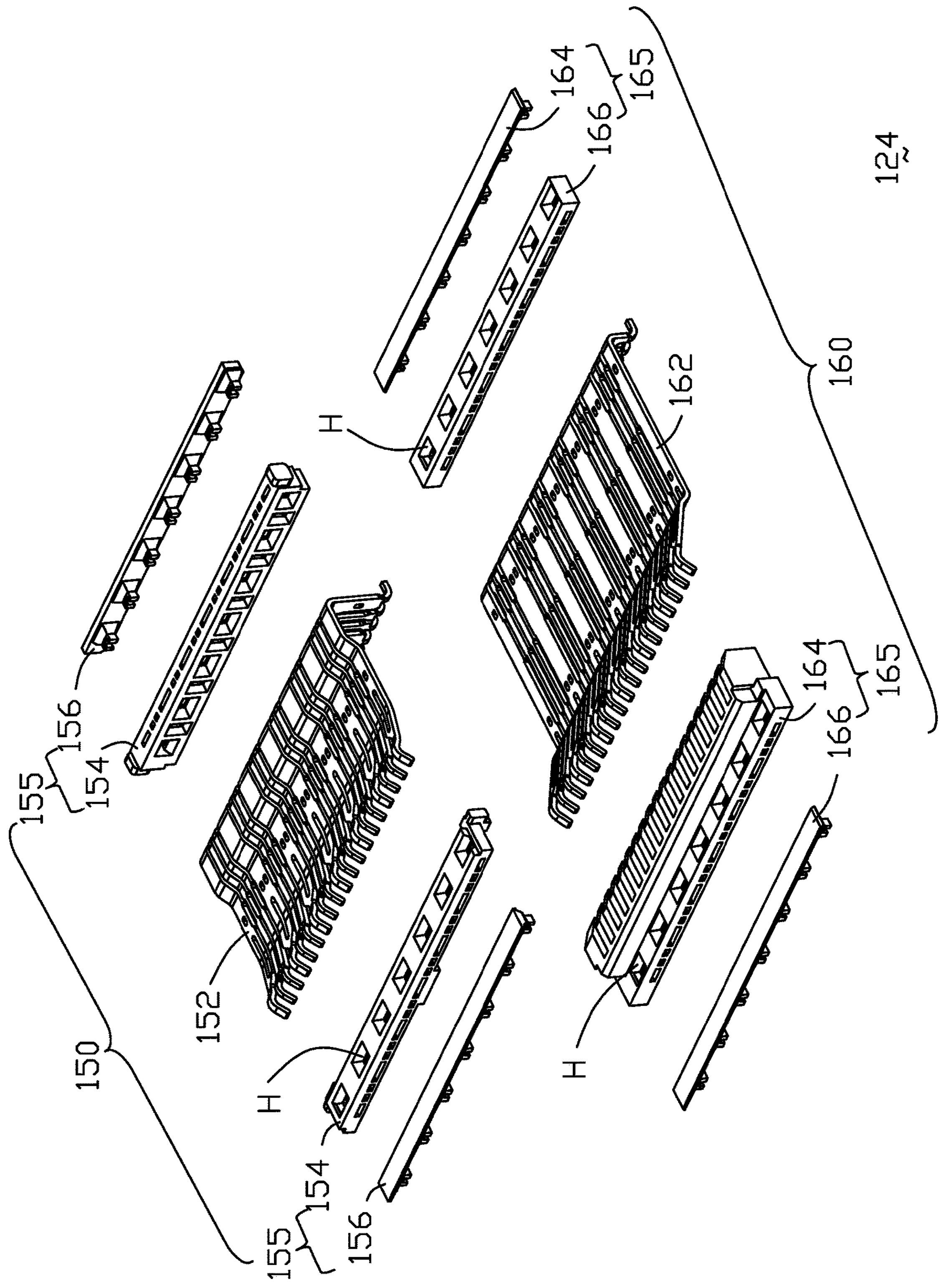
FIG. 7(A) is an exploded perspective view of the lower contact unit of the contact module of module of the electrical connector of FIG. 5(A)
Figure 7B:
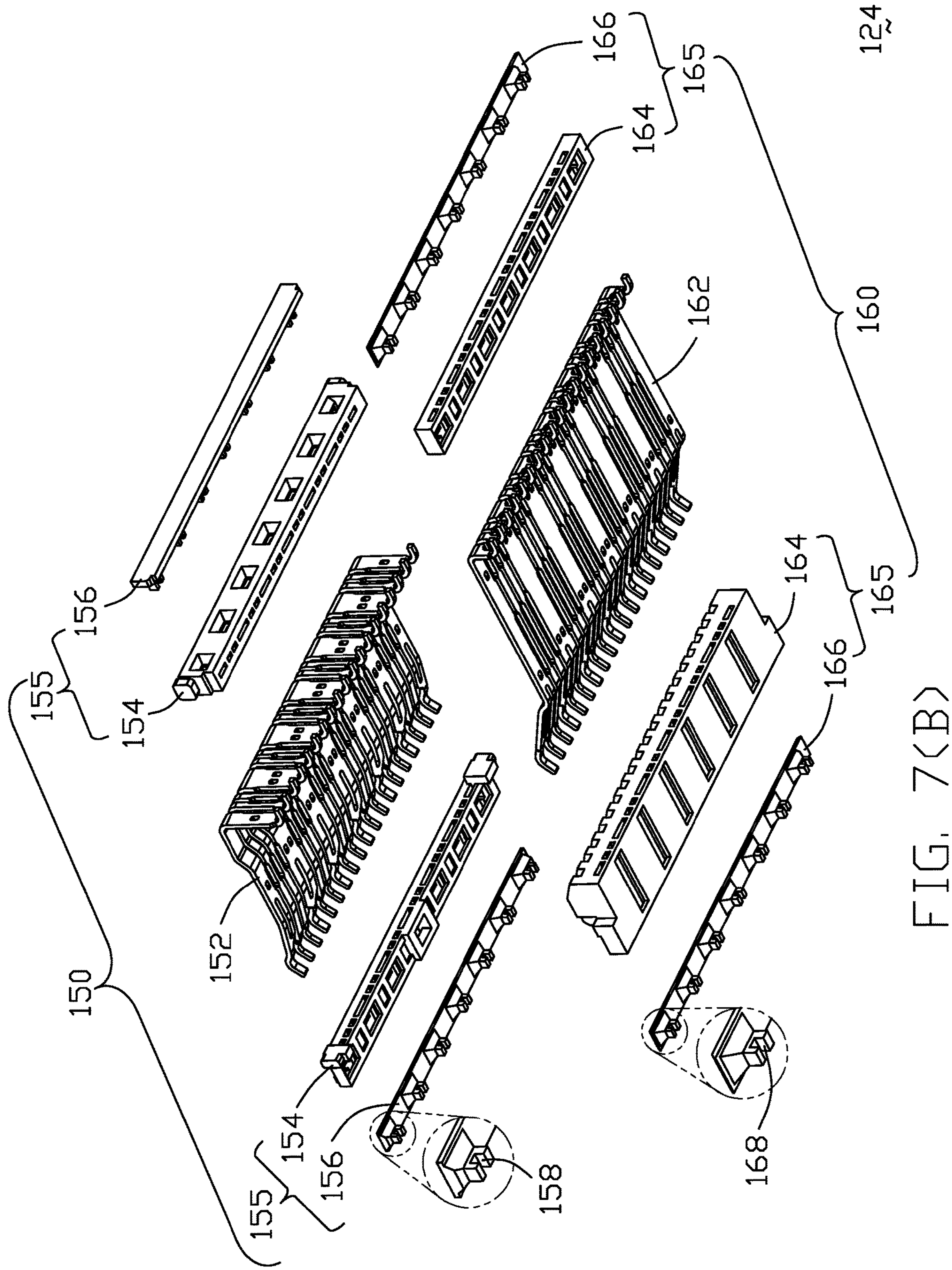
FIG. 7(B) is another exploded perspective view of the lower contact unit of the contact module of the electrical connector of FIG. 7(A)
Figure 8A:
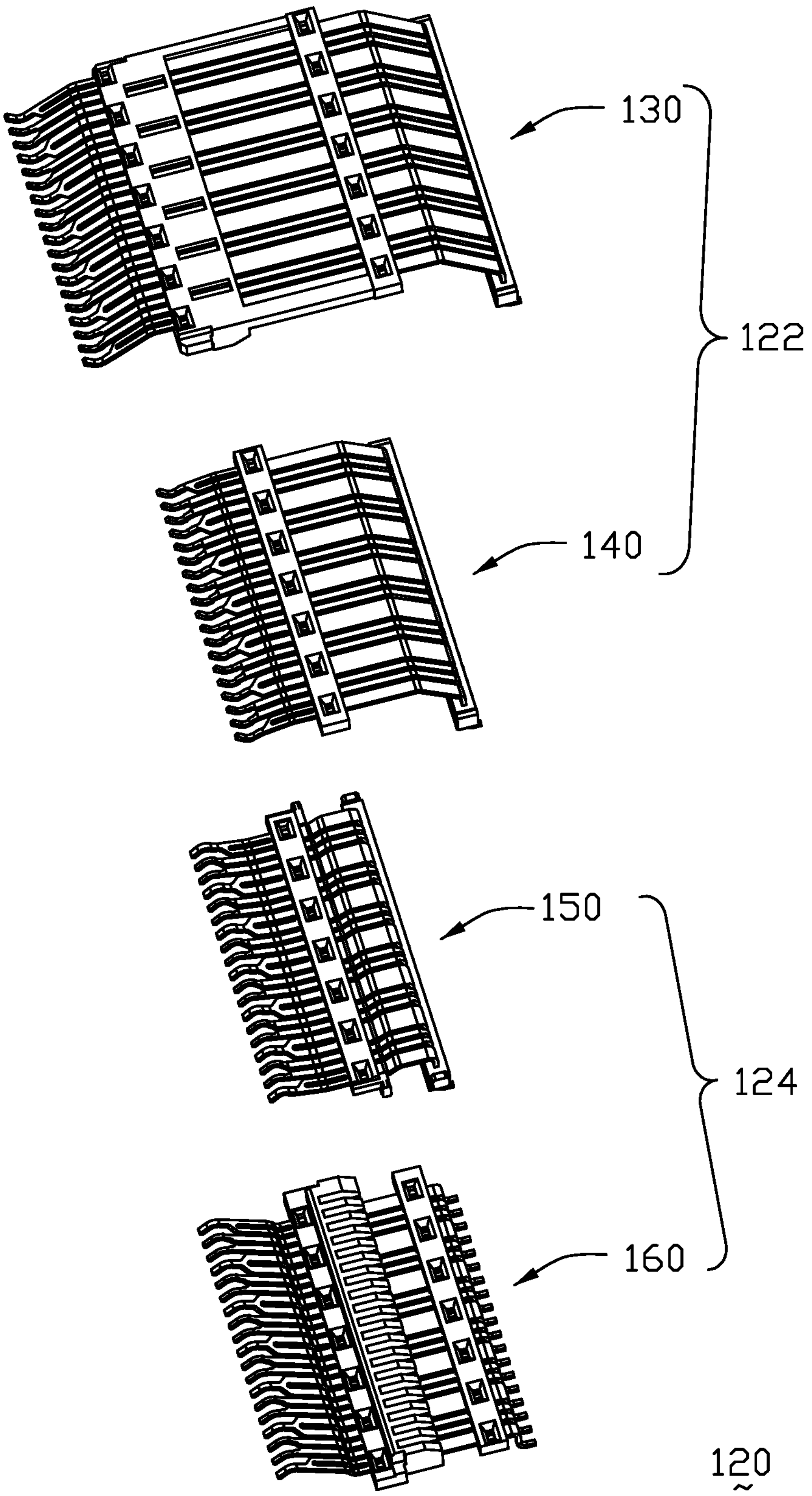
FIG. 8(A) is an exploded perspective view of the contact module of the electrical connector of FIG. 4(A) without showing the conductive secondary parts of the plastic tie bars.
Figure 8B:
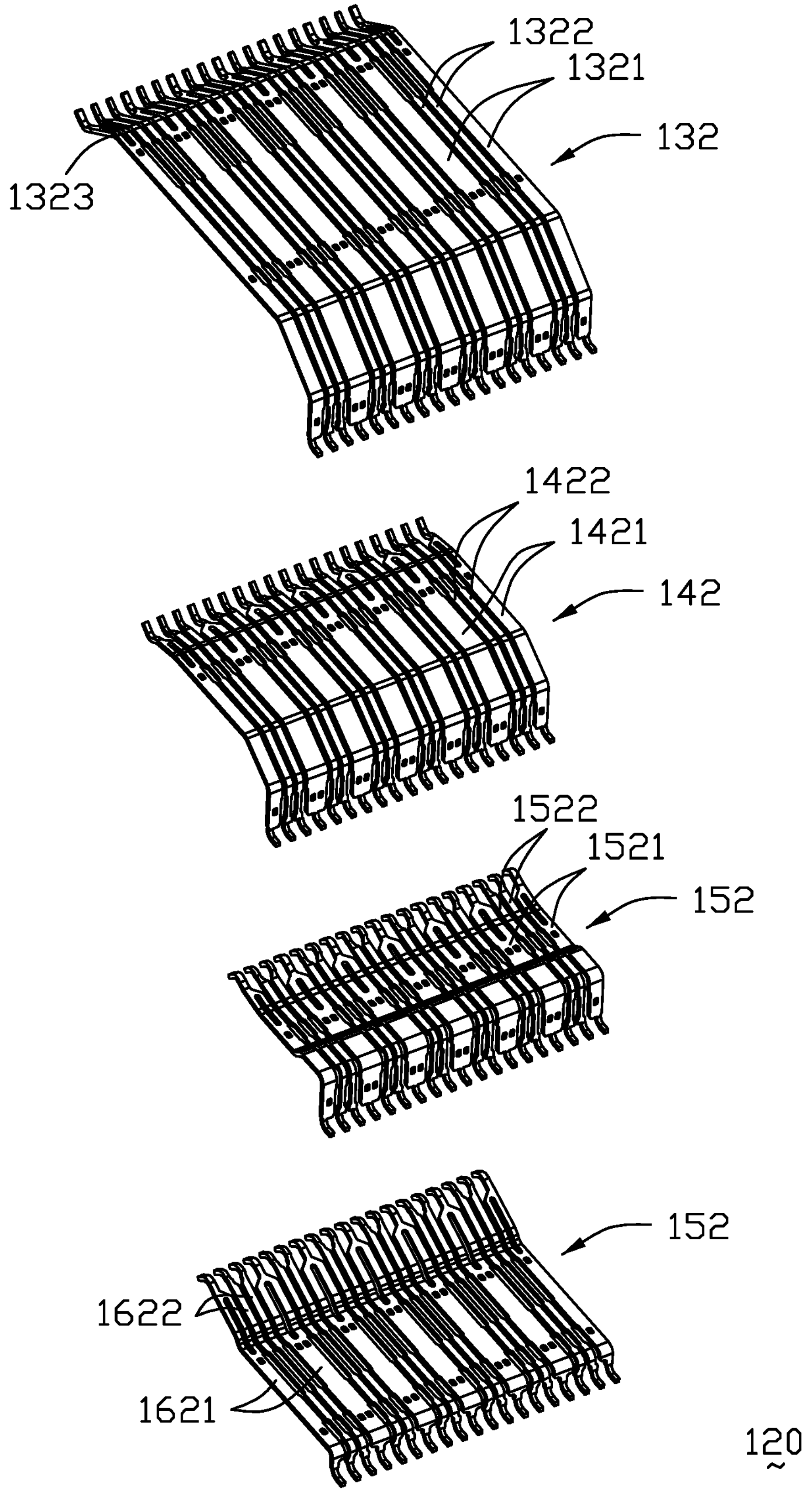
FIG. 8(B) is an exploded perspective view of the contact module of FIG. 8(A) without showing the plastic tie bars.
Figure 9A:
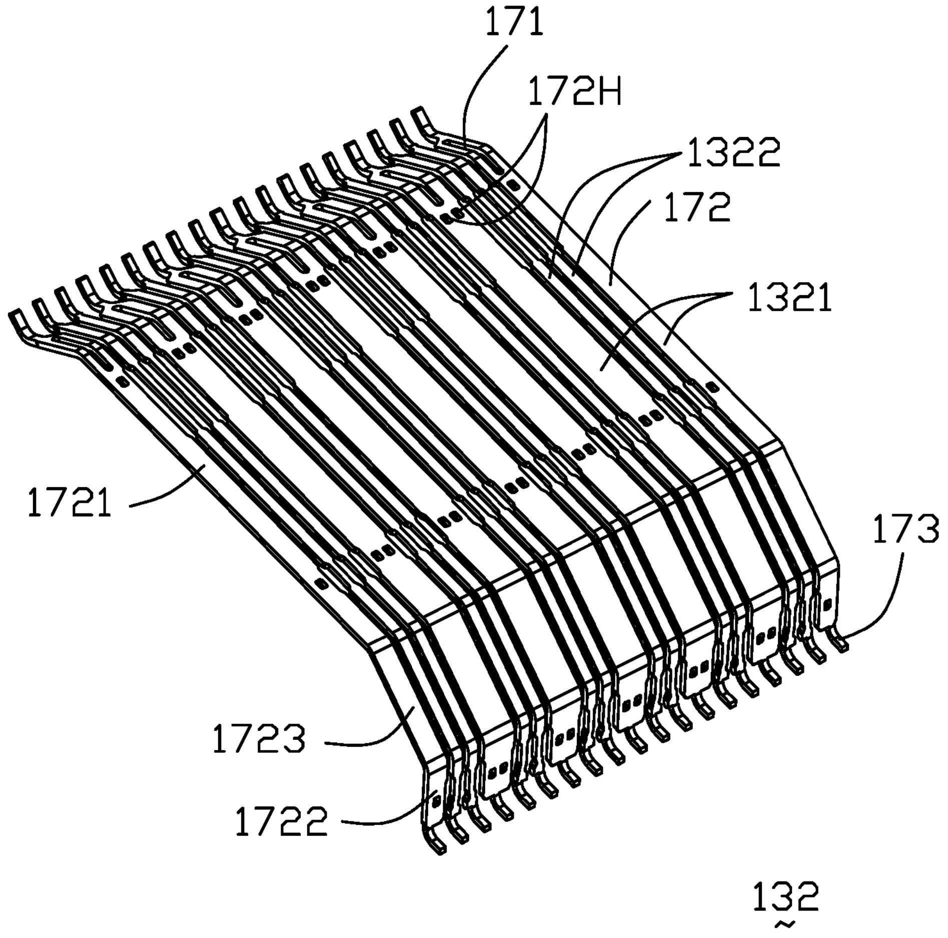
FIG. 9(A) is a perspective view of the contacts of the front/outer contact part of the upper contact unit of the contact module of the electrical connector of FIG. 1(A)
Figure 9B:
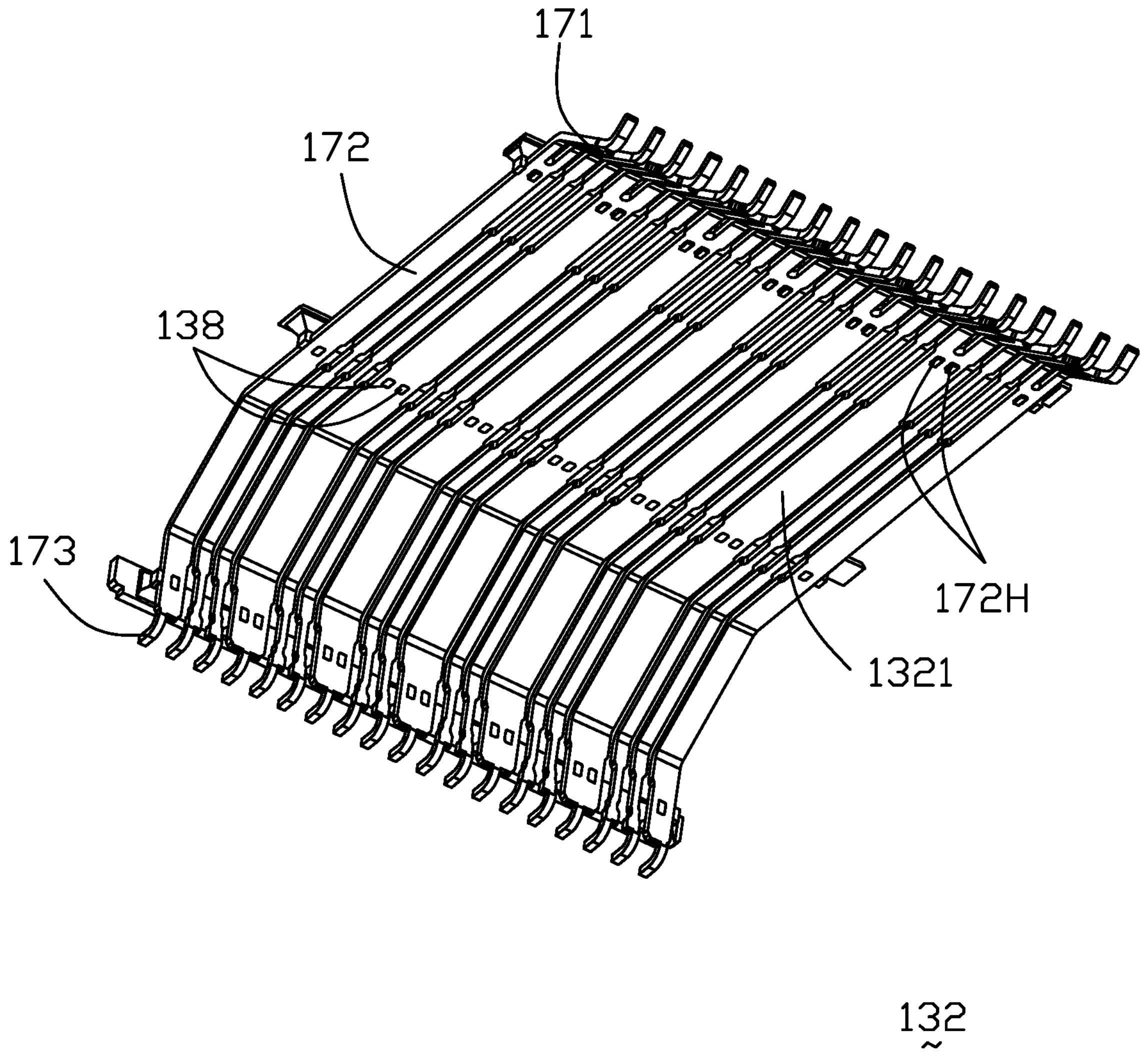
FIG. 9(B) is another perspective view of the front/outer contact part of the upper contact unit of the contact module the electrical connector of FIG. 8(A) without showing the corresponding insulative primary part.
Figure 10:
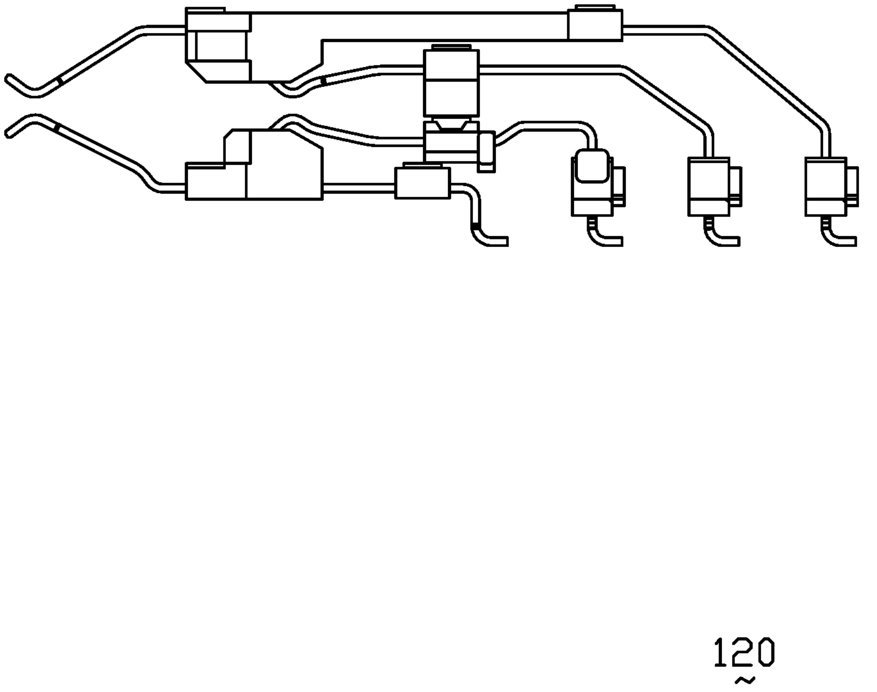
FIG. 10 is a side view of the contact module of the electrical connector of FIG. 1(A)

Reference will now be made in detail to the embodiments of the present disclosure.

Referring to FIGS. 1(A)-12, an electrical connector 100 includes an insulative housing 110 cooperating with an insulative cover 108 to commonly receive a contact module 120 therein. The contact module 120 includes an upper contact unit 122 and a lower contact unit 124 stacked with each other in the vertical direction in essentially a mirror image arrangement. The upper contact unit 122 includes an (upper) front/outer contact part 130 and an (upper) rear/inner contact part 140 stacked with each other in the vertical direction, and the lower contact unit 124 includes a (lower) front/outer contact part 160 and a (lower) rear/inner contact part 150 stacked with each other in the vertical direction.

The upper front/outer contact part 130 includes a plurality of contacts 132 integrally formed with a plurality of transversely extending plastic tie bars 135 via insert-molding. The plurality of plastic tie bars 135 are arranged along the extending direction of the contact 132. Each plastic tie bars 135 includes an insulative primary part 134 and a conductive secondary part 136. Similarly, the upper rear/inner contact part 140 includes a plurality of contacts 142 integrally formed with a plurality of transversely extending plastic tie bars 145 via insert-molding and each plastic tie bar 145 includes an insulative primary part 144 and a conductive secondary part 146; the lower front/outer contact part 160 includes a plurality of contacts 162 integrally formed with a plurality transversely extending plastic tie bars 165, and each plastic tie bar includes an insulative primary part 164 and a conductive secondary part 166; the lower rear/inner contact part 150 includes a plurality of contacts 152 integrally formed with a plurality of transversely extending plastic tie bars 155 and each plastic tie bar 155 includes an insulative primary part 154 and a conductive secondary part 156. In the (upper) front/outer contact part 130, the (upper) rear/inner contact part 140, the (lower) front/outer contact part 160 and the (lower) rear/inner contact part 150, the (upper) front/outer contact part 130 has the longest dimension in the front-to-rear direction. The number of the plastic tie bars 135 forms on the (upper) front/outer contact part 130 is more than the number of plastic tie bars on other contact parts. Notably, as shown in FIGS. 6(A)-7(B), the insulative primary part 134 forms a plurality of upwardly facing funnel like recesses H, and the conductive secondary part 136 forms a plurality of downwardly extending protrusions 138 received within the corresponding recess H. Similarly, the conductive secondary part 146 forms the protrusions 148, the conductive secondary part 166 forms the protrusions 168 and the conductive second part 156 forms the protrusions 158 for respectively reception with the corresponding recesses H in the corresponding insulative primary parts.

The contacts 132 include a plurality of differential-pair signal contacts 1322 and a plurality of grounding contacts 1321 alternately arranged with each other in the transverse direction. At least one pair of differential-pair signal contacts 1322 is disposed between a pair of the grounding contacts 1321. Similarly, the contacts 142 having the corresponding differential-pair signal contacts 1422 and grounding contacts 1421, the contacts 162 having the corresponding differential-pair signal contacts 1622 and grounding contacts 1621, and the contacts 152 having the corresponding differential-pair signal contacts 1522 and grounding contacts 1521, are also alternately arranged with each other in the transverse direction. Because the arrangement between the plastic tie bar and the corresponding contacts is essentially same to each contact part, only the upper front/outer contact part is illustrated. As shown in FIGS. 6(B), 7(B) and 9(A)-12, each contact 132 includes a front deflectable resilient contacting section 171 for mating with a mating connector, a rear mounting section 173 for mounting to a printed circuit board and a retaining section 172 therebetween to retain the contact in the housing, the mounting section 173 soldered to the circuit board. Each contact 132 includes a cantilever arm that cantilever forward. The front deflectable resilient contacting section 171 is located at the front of the cantilever arm. The contacts 132 are all side-to-side coupled from the front deflectable resilient contacting section 171 to the mounting section 173. The width of the two grounding contacts 1321 located at the outermost side in the lateral direction is smaller than the width of the other grounding contacts 1321. The center distance between the differential-pair signal contacts 1322 from the contacting section 171 to the mounting section 173 is constant. The center distance between the grounding contact 1321 and the signal contact 1322 adjacent to it from the contacting section 171 to the mounting section 173 is constant. The center distance refers to the distance from the center line of one contact to the center line of the other contact. The width of the retaining section 172 of the grounding contact 1321 is greater than the width of the retaining section 172 of the signal contact 1322. The cantilever arm of each grounding contact 1321 is provided with an opening 1323 to reduce the elastic force. The width of the grounding contact 1321 where the opening 1323 is provided is greater than the width of the contacting section 171. The opening 1323 extends along the length of the contact. The opening 1323 does not extend to the contacting section 171. The periphery of the opening 1323 is completely contained in the grounding contact 1321. The opening 1323 is not covered by the plastic tie bars 135. The length of each contact 132 fixed in the plastic tie bars 135 is less than half of the length of the retaining section. The retaining section 172 includes a horizontal section 1721, a vertical section 1722 and an oblique section 1723 therebetween. Via insert-molding, two plastic tie bars 135 are integrally formed upon the horizontal section 1721, and a plastic tie bars 135 is integrally formed upon the vertical section 1722, thus commonly forming the whole (upper) front/outer contact part 130 as a whole. The width of the contact 132 in t plastic tie bars 135 is smaller than the width of other parts of the retaining section 172. At least two of the plastic tie bars 135 are connected together to increase the overall stability of the (upper) front/outer contact part 130. The two plastic tie bars 135 arranged on the horizontal section 1721 are connected to each other on the corresponding two sides in the transverse direction. The two sides of the insulative primary part 134 of the two plastic tie bars 135 arranged in the horizontal section 1721 are connected together, but the conductive secondary part 136 is not connected together. The insulative primary part 134 of the plastic tie bars 135 at the front includes a main body 1341 and two connecting portions 1342 extending backward on both corresponding sides of the main body 1341. The connecting portion 1342 is connected to the plastic tie bars 135 at the rear of the horizontal section 1721. The connecting portion 1342 is not molded with any contact 132. Wherein the grounding contact 1321 is further equipped with a pair of holes 172H. The funnel like recesses H of insulative primary part 134 are aligned with the corresponding grounding contacts 1321 and particularly to the holes 172H of the corresponding grounding contacts 1321 so as to allow the corresponding protrusions 138 to be received within the holes 172H for creating a reliable mechanical and electrical connection between the conductive secondary part 136 and the grounding contacts 1321. Understandably, without the holes 172H to receive the material of the conductive secondary part 136, the conductive secondary part 136 still contacts the upper surface of the grounding contact 1321 for establishing the electrical connection. Notably, in this first embodiment, the conductive secondary part 136 does not occupy the recess 134H which is formed in the insulative primary part 134 and located under the pair of holes 172H. The opening 1323 of the grounding contact 1321 is located in front of the hole 172H In brief, in the upper front/outer contact part 130, all the contacts 132 are firstly integrally formed within the insulative primary part 134 to form an initial piece via a first stage insert-molding while leaving the tunnel like recesses H to upwardly expose the corresponding grounding contacts 1321, and the conductive secondary part 136 is successively applied, via a second stage insert-molding, upon such an initial piece to fill the corresponding tunnel like recesses H so as to electrically connect all the grounding contacts 1321, but not connected to the signal contact 1322. Therefore, all the contacts 132 are not only securely embedded within the plastic tie bar 135 essentially composed of the insulative primary part 134 and the conductive secondary part 136 from a mechanical viewpoint but also all connected for the grounding contacts 1321 from the electrical viewpoint. All grounding contacts 1321 are electrically connected into a whole through conductive secondary part.

Figure 11A:
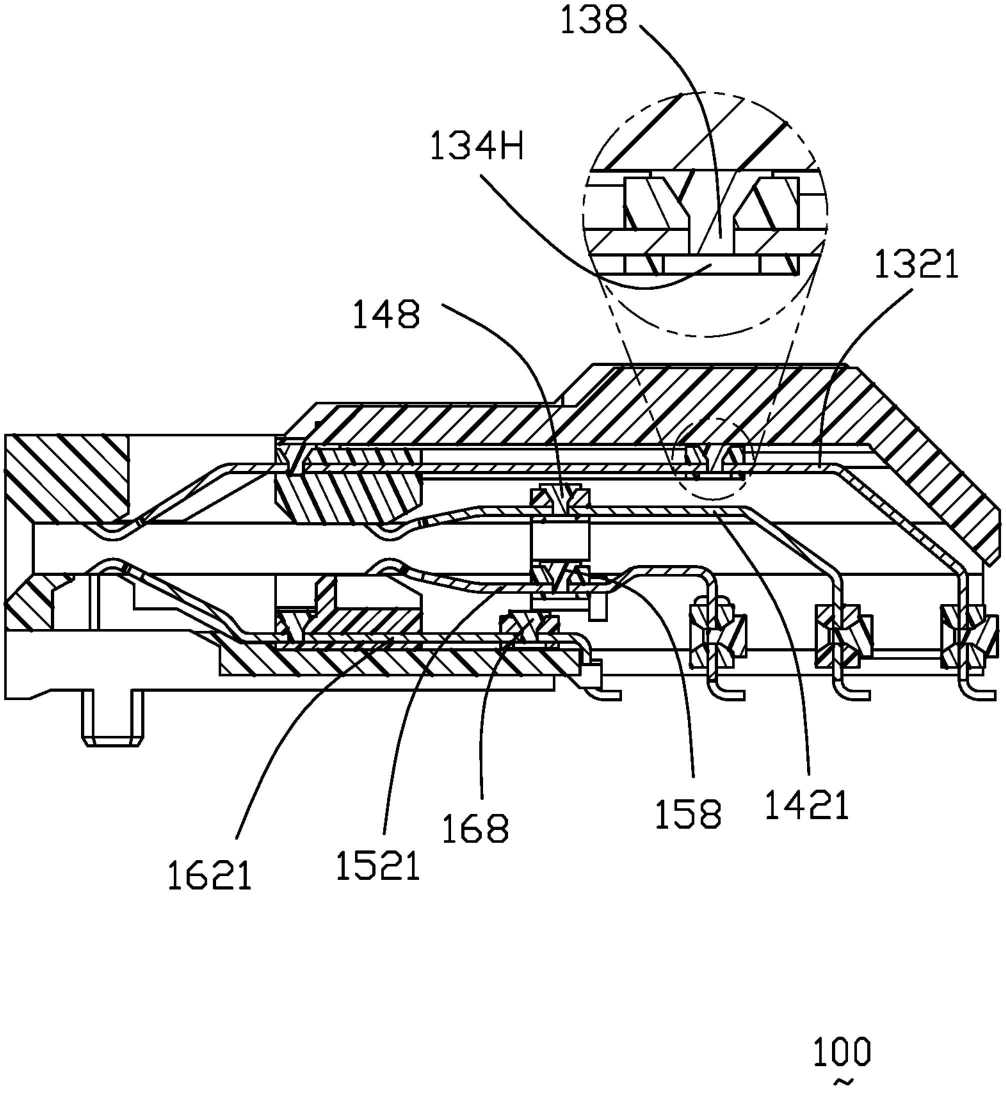
FIG. 11(A) is a cross-sectional view of the electrical connector of FIG. 1(A)
Figure 11B:
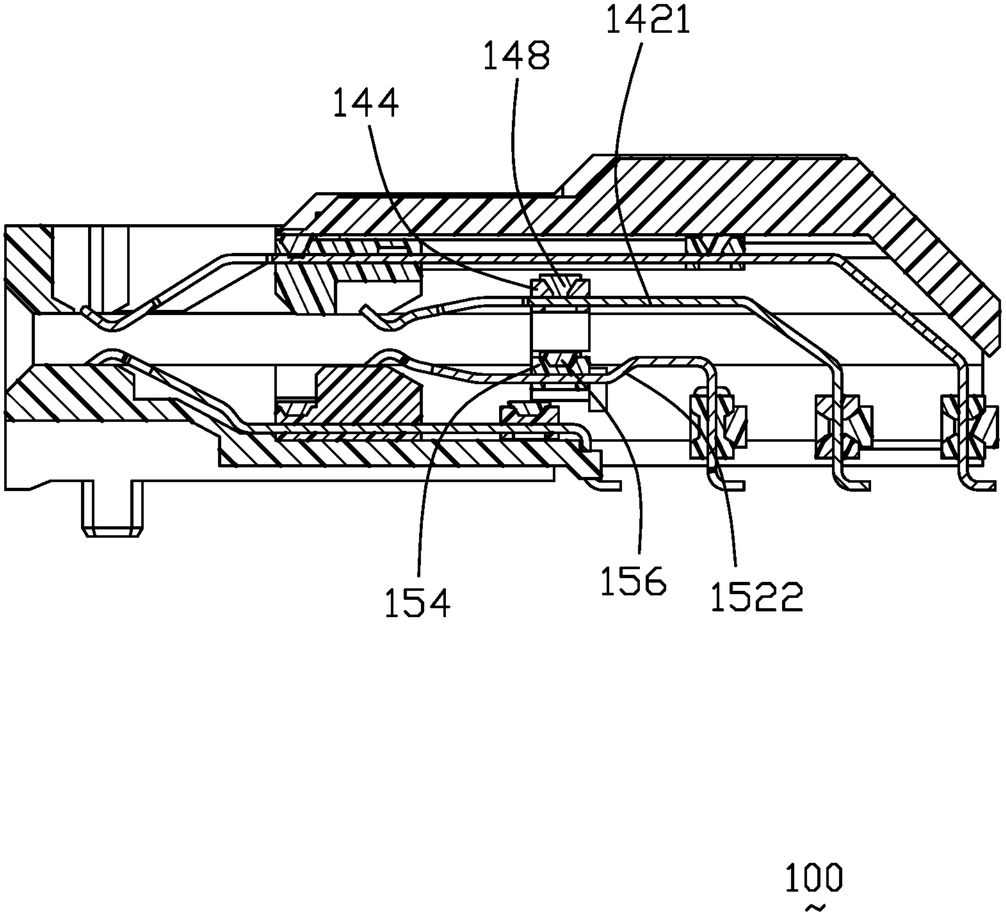
FIG. 11(B) is another cross-sectional view of the electrical connector of FIG. 1(A)
Figure 12:
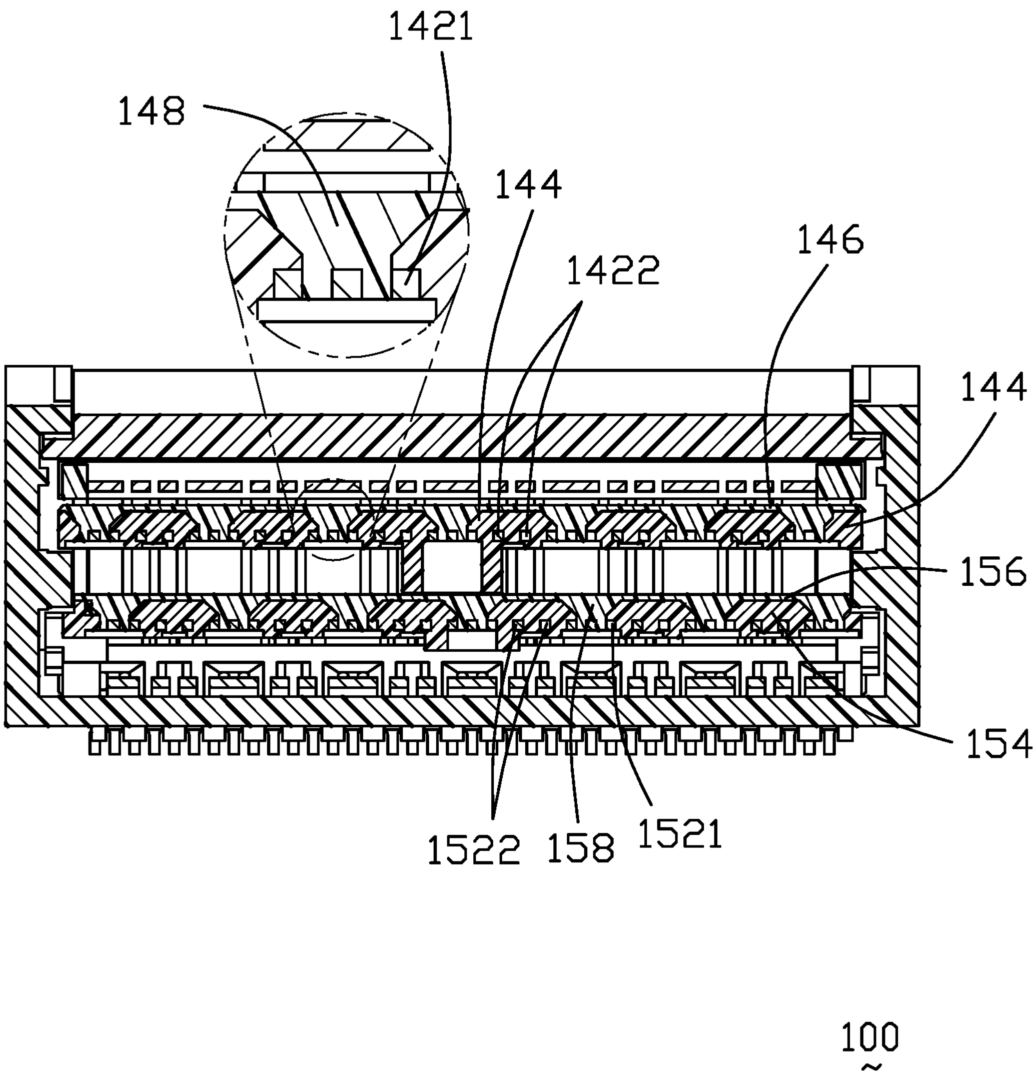
FIG. 12 is another cross-sectional view of the electrical connector of FIG. 1(A)
Figure 13A:
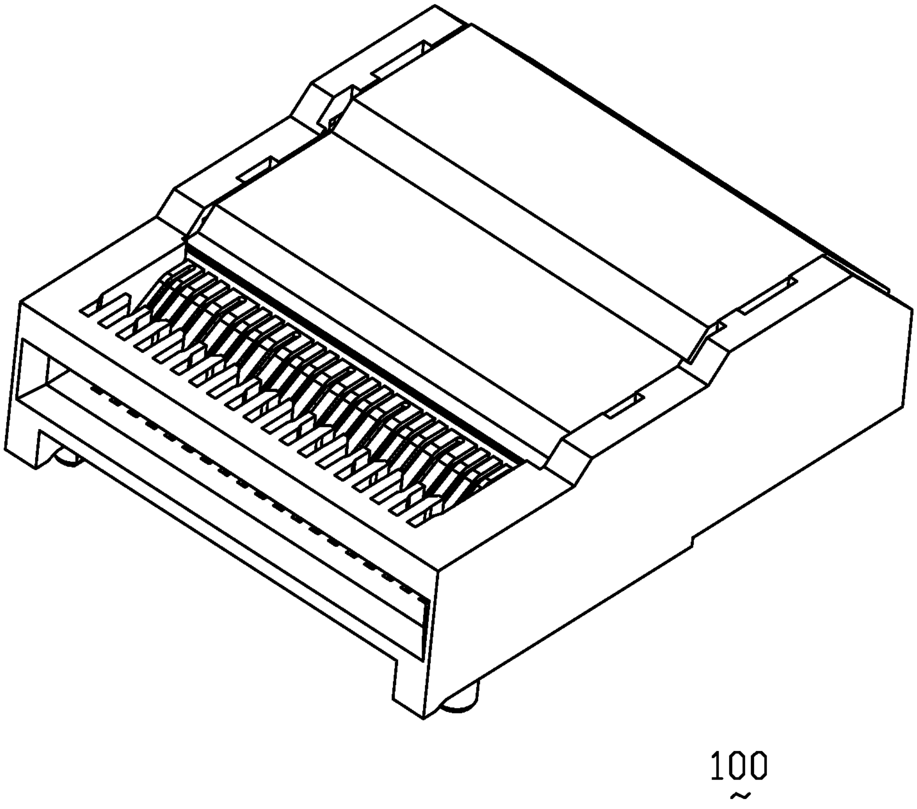
FIG. 13(A) is a perspective view of an electrical connector according to a second embodiment of the first invention.
Figure 13B:
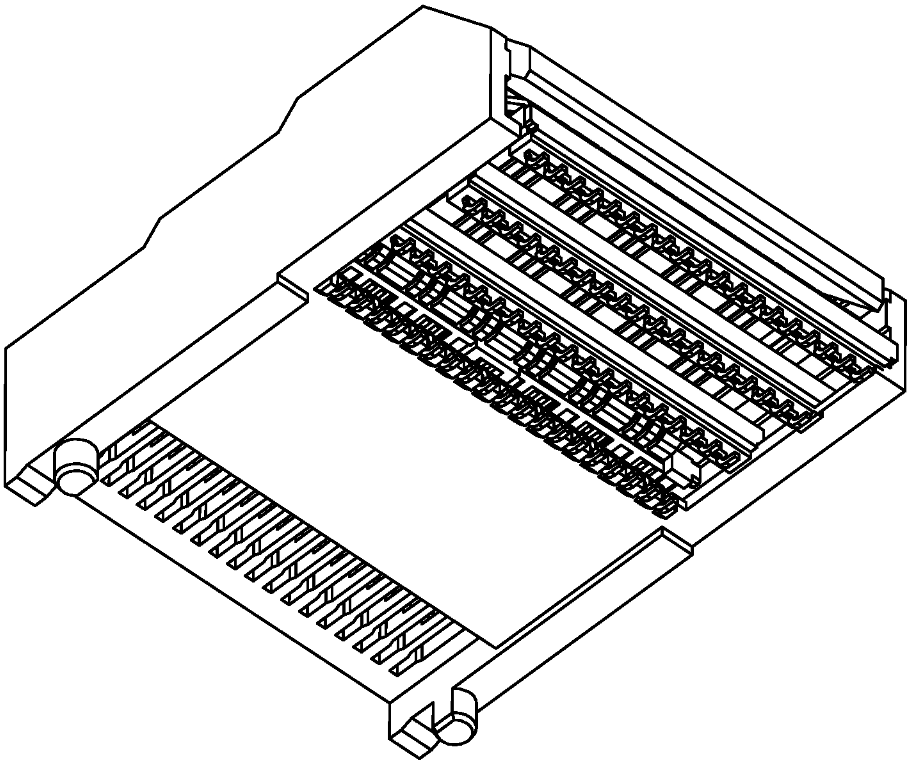
FIG. 13(B) is another perspective view of the electrical connector of FIG. 13(A)
Figure 14A:
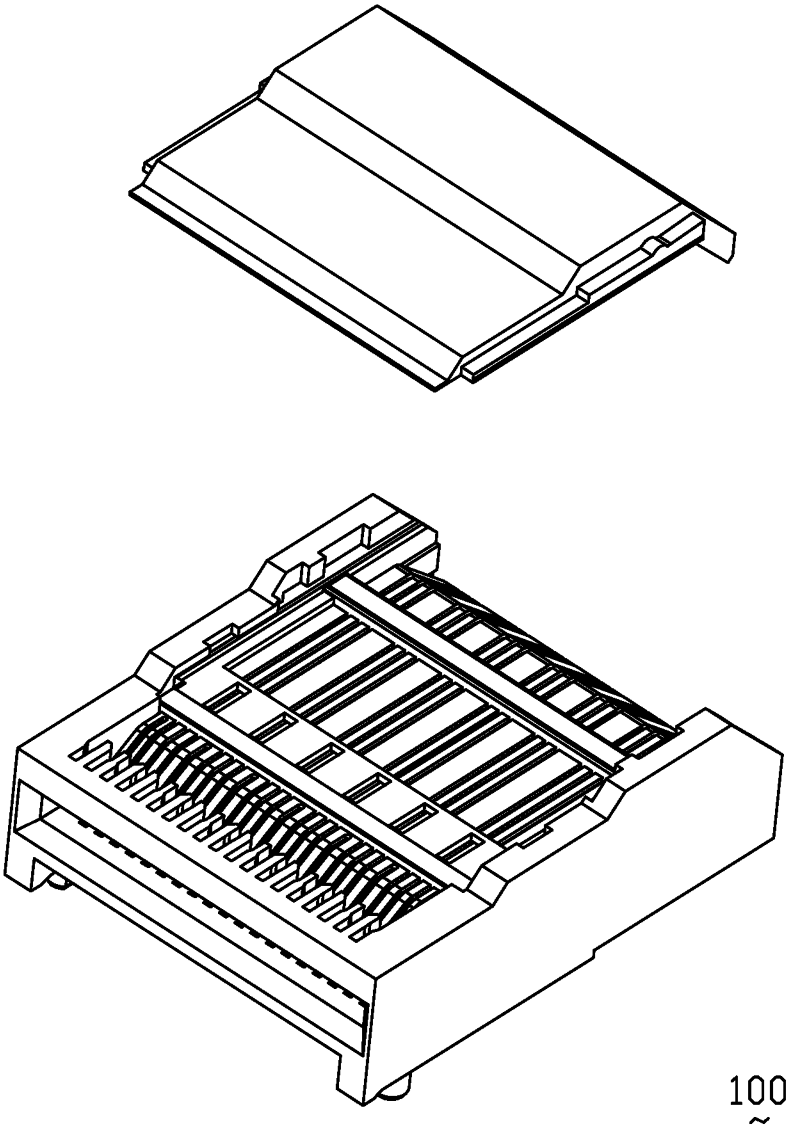
FIG. 14(A) is an exploded perspective view of the electrical connector of FIG. 13(A)
Figure 14B:
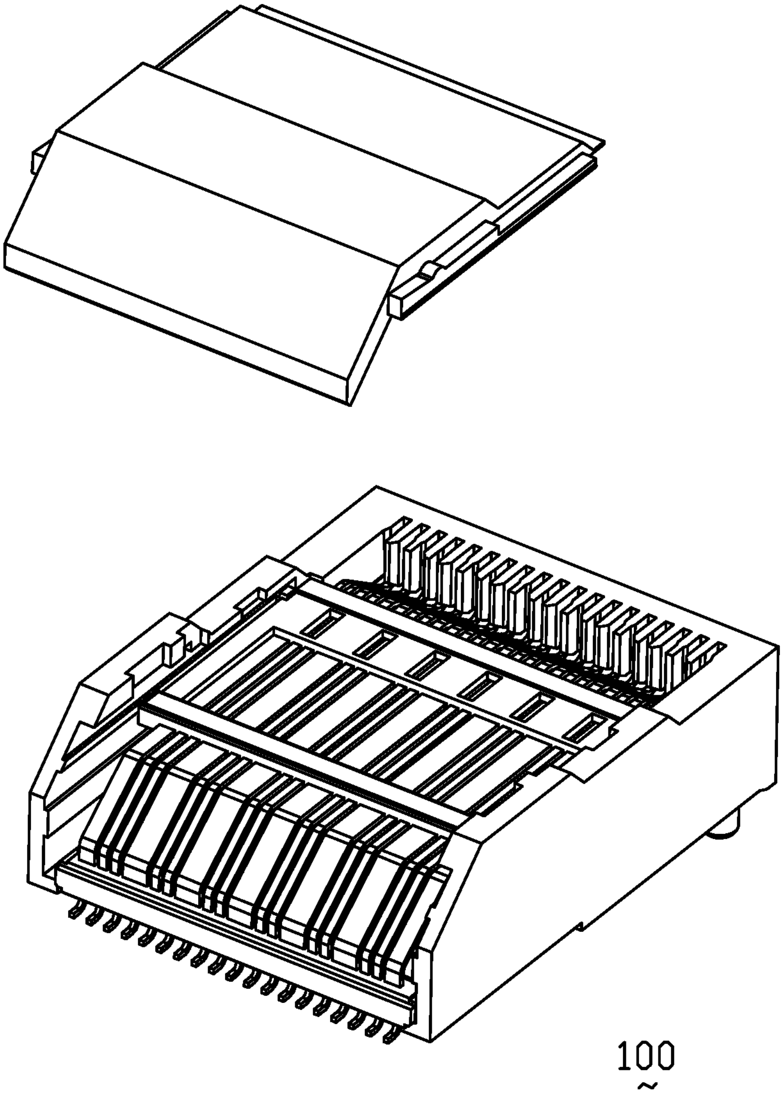
FIG. 14(B) is another exploded perspective view of the electrical connector of FIG. 14(A)
Figure 15A:
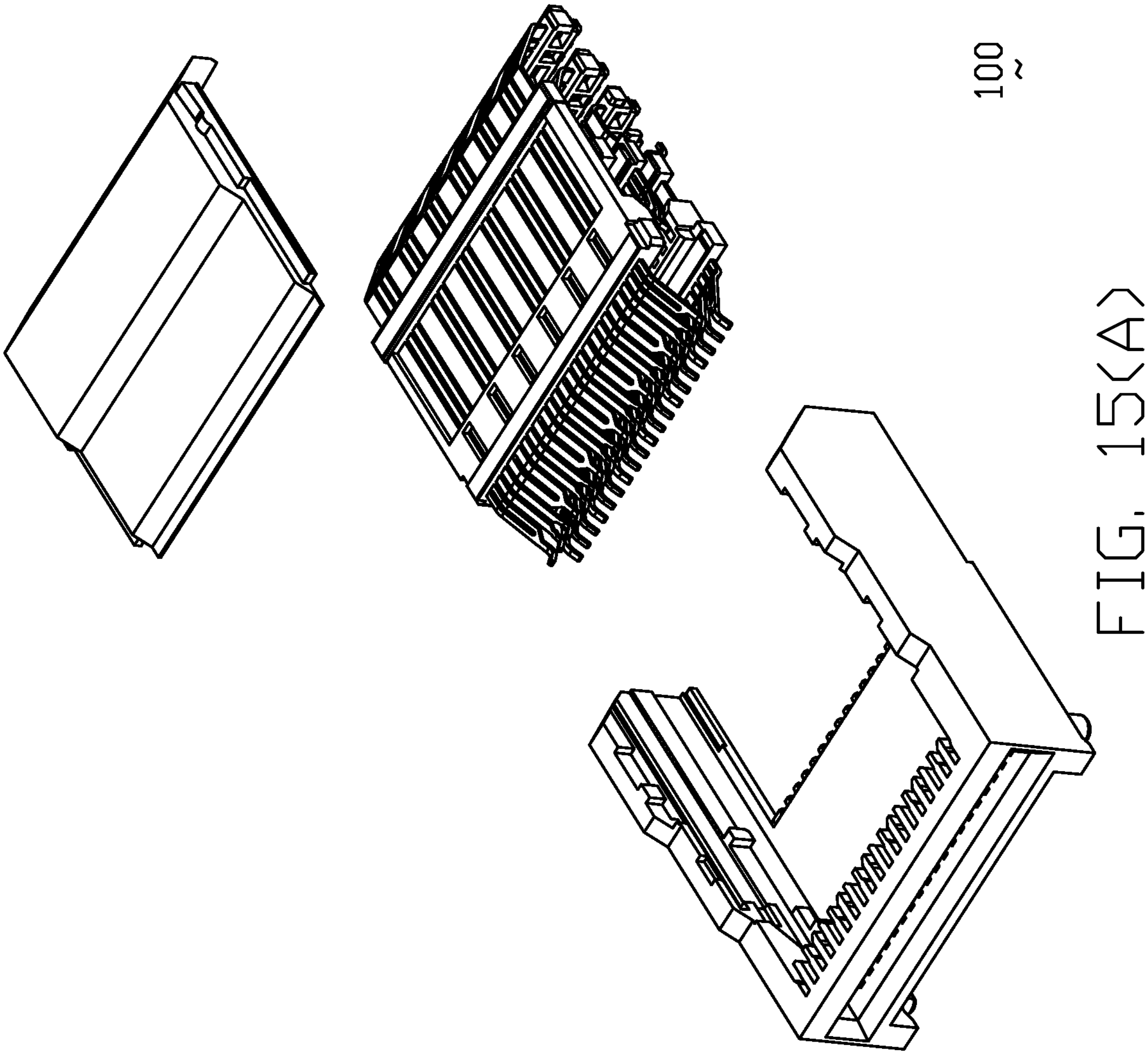
FIG. 15(A) is a further exploded perspective view of the electrical connector of FIG. 14(A)
Figure 15B:
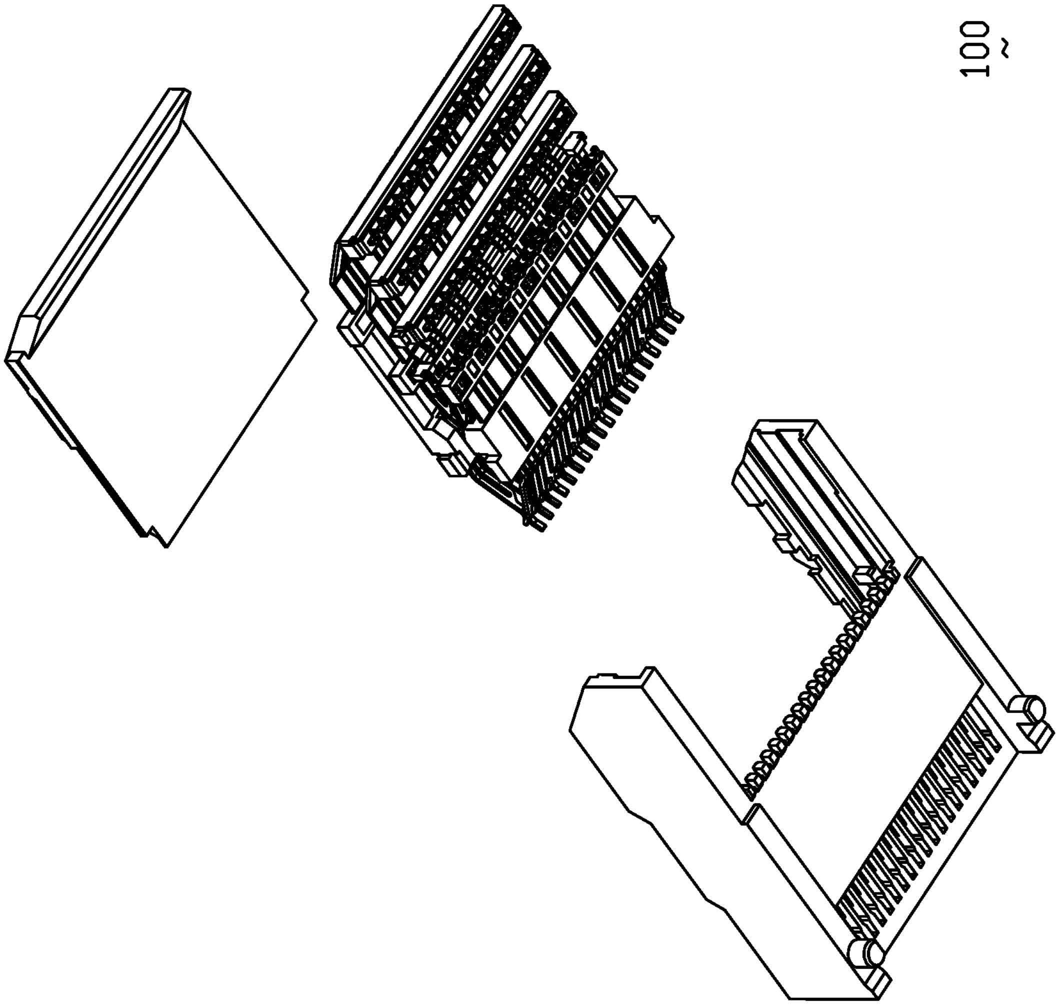
FIG. 15(B) is another exploded perspective view of the electrical connector of FIG. 15(A)
Figure 16A:
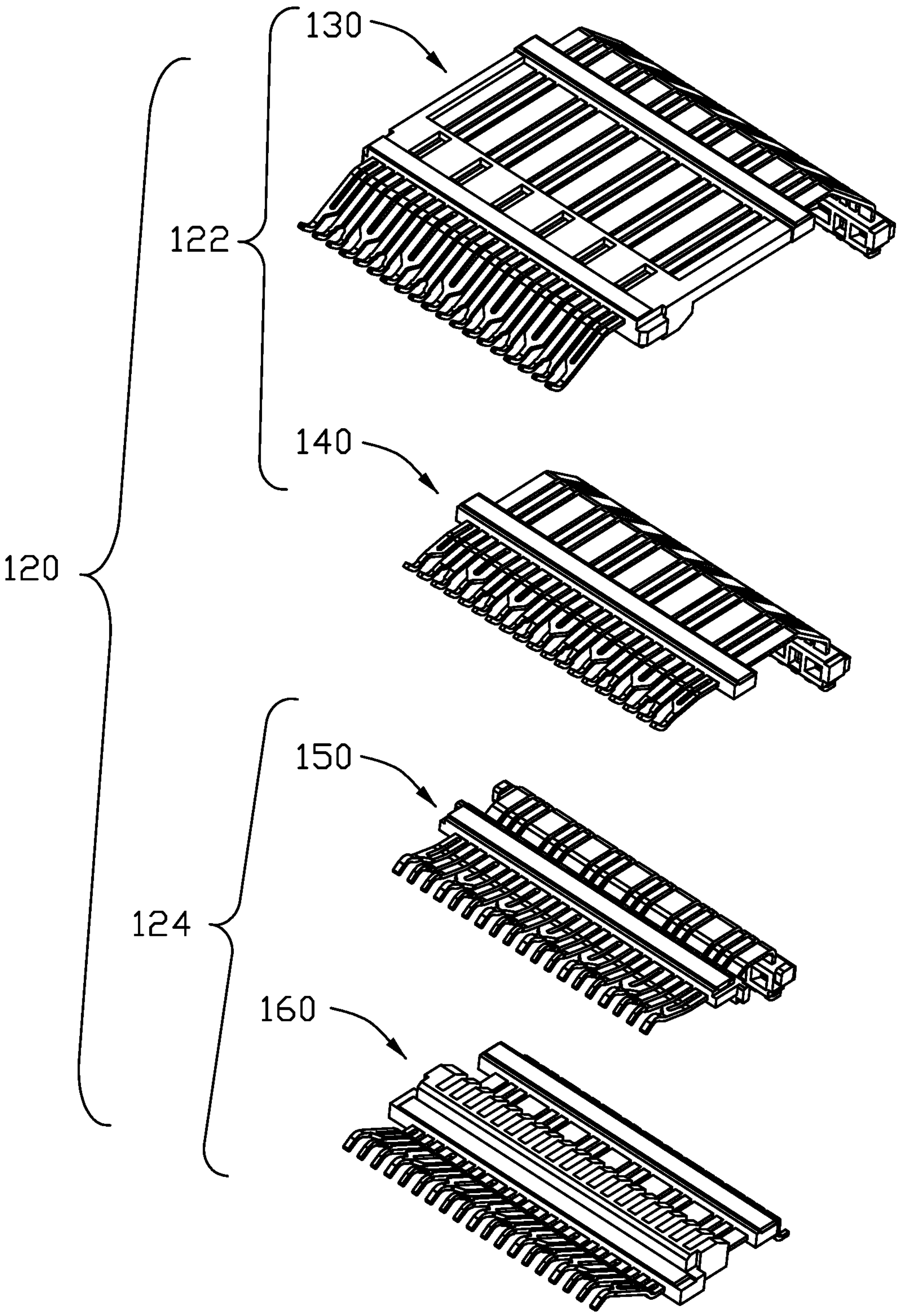
FIG. 16(A) is an exploded perspective view of the contact module of the electrical connector of FIG. 15(A)
Figure 16B:
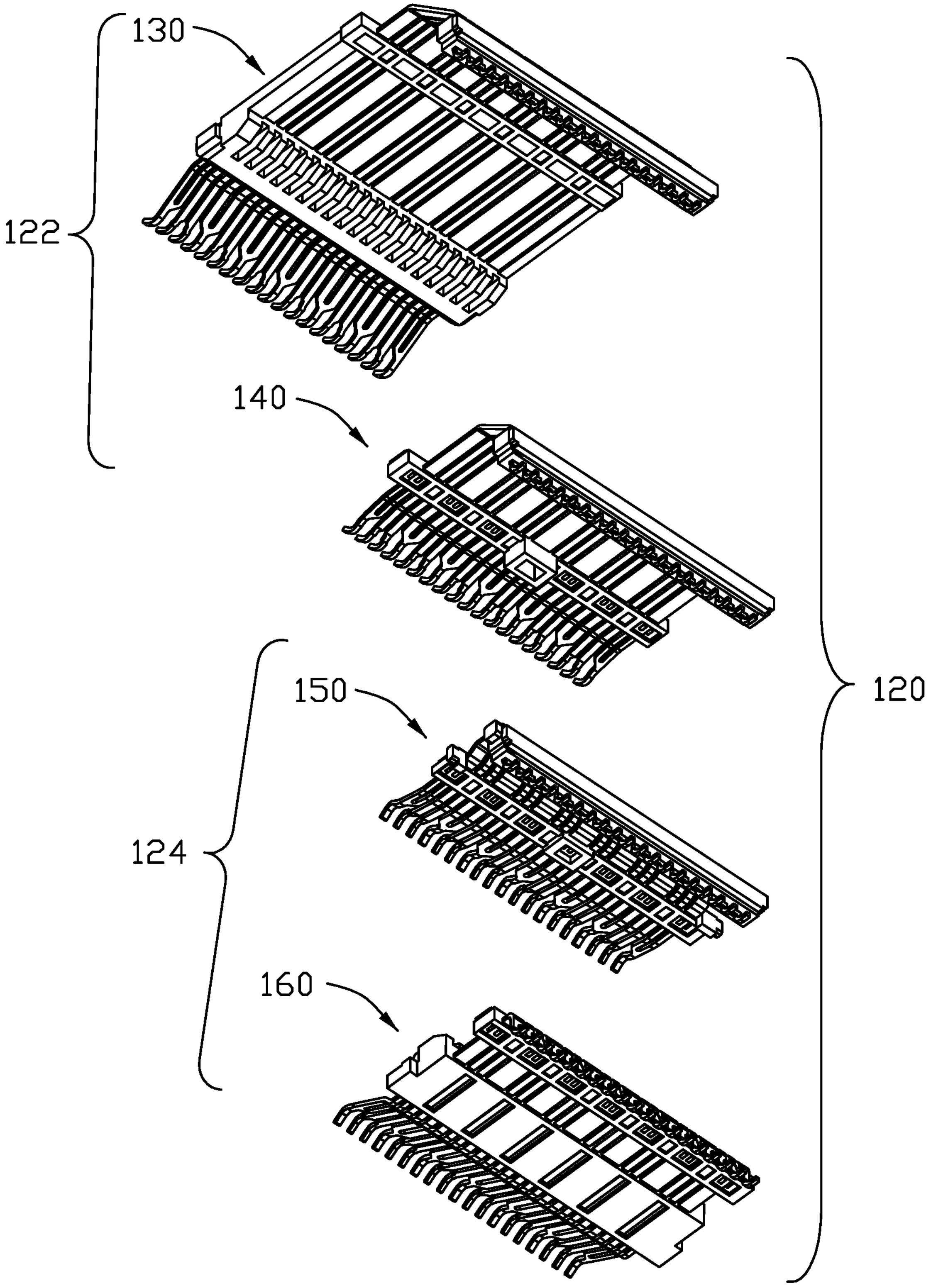
FIG. 16(B) is another exploded perspective view of the contact module of the electrical connector of FIG. 16(A)
Figure 17A:
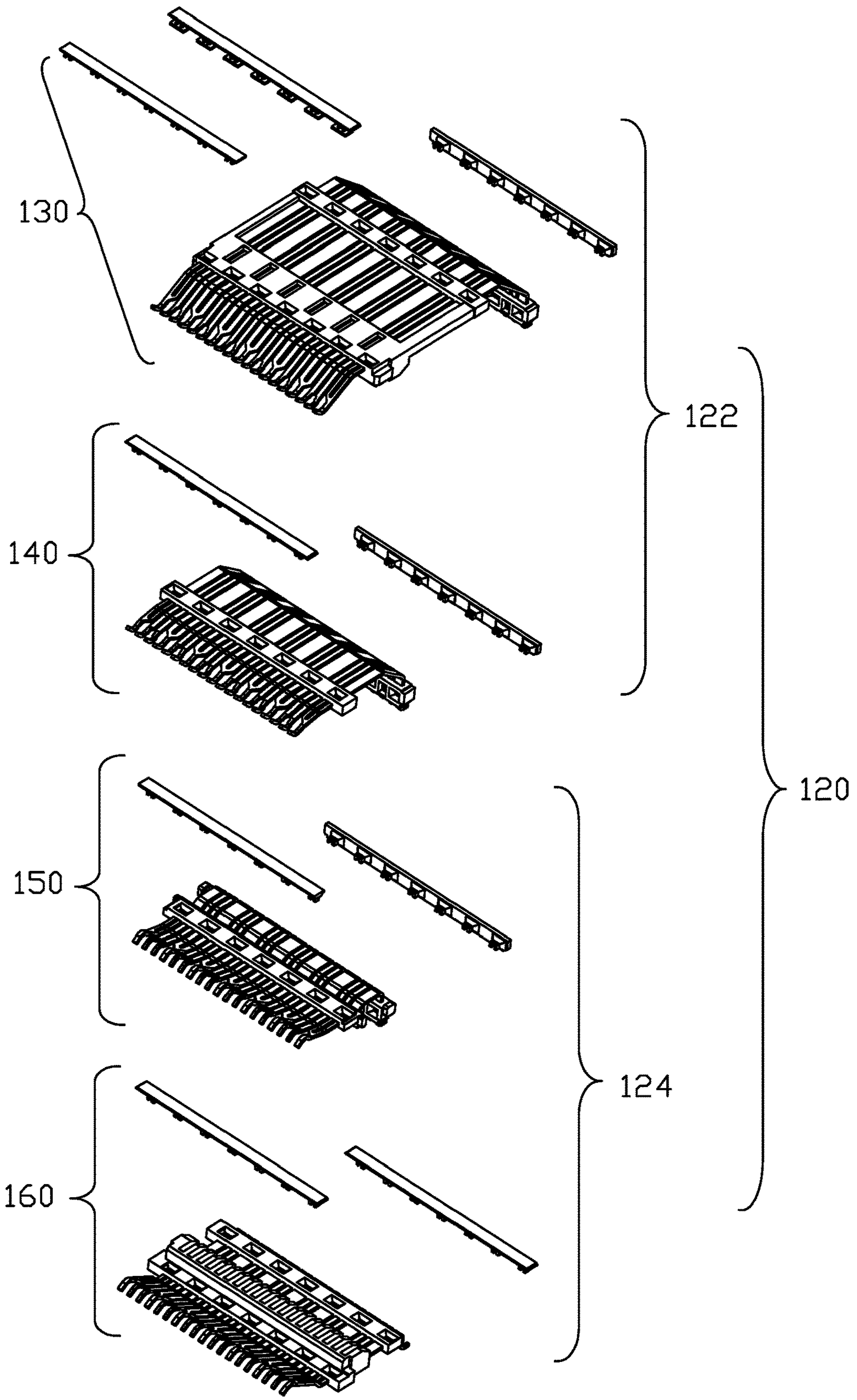
FIG. 17(A) is a further exploded perspective view of the contact module of the electrical connector of FIG. 16(A)
Figure 17B:
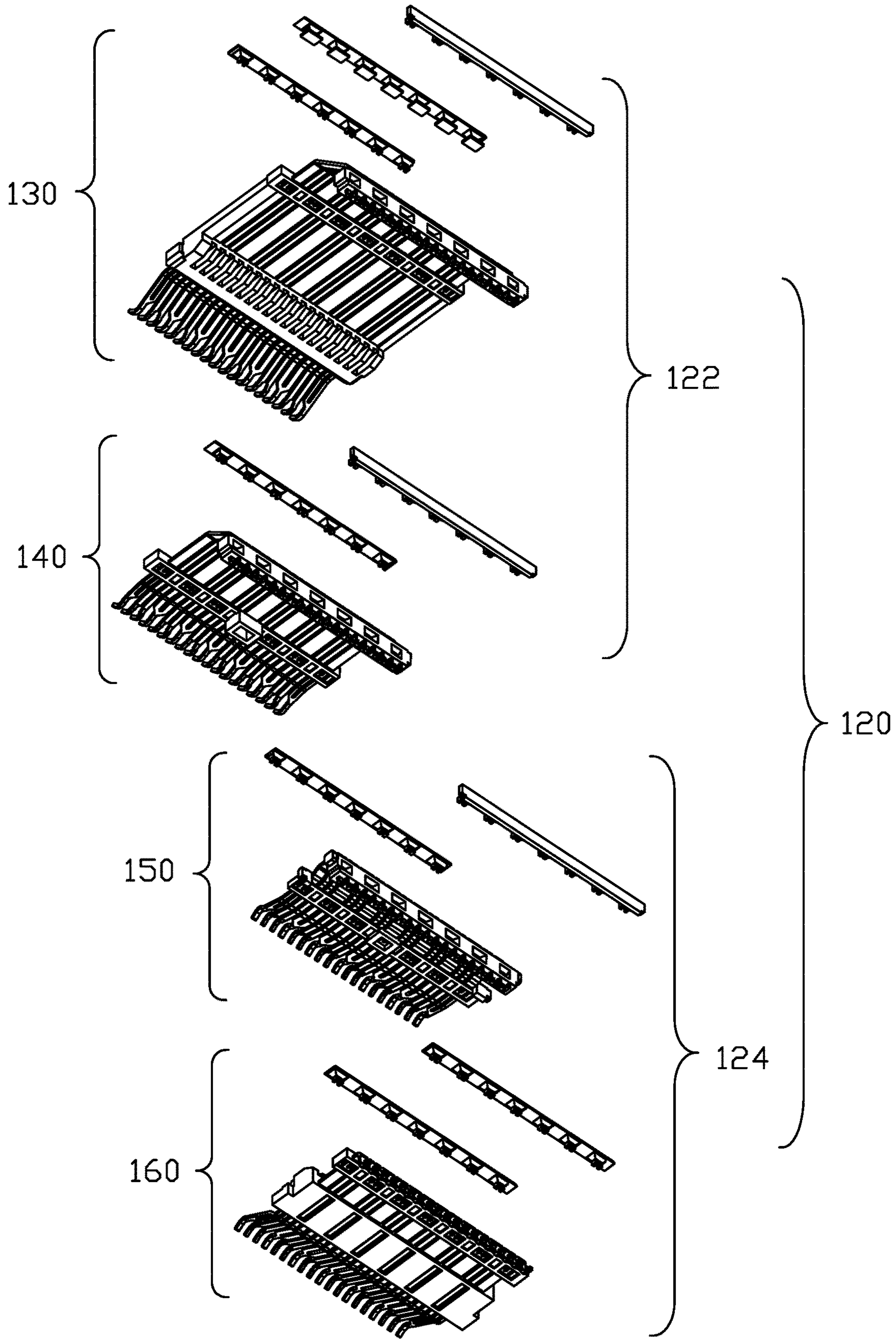
FIG. 17(B) is another exploded perspective view of the contact module of the electrical connector of FIG. 17(A)
Figure 18A:
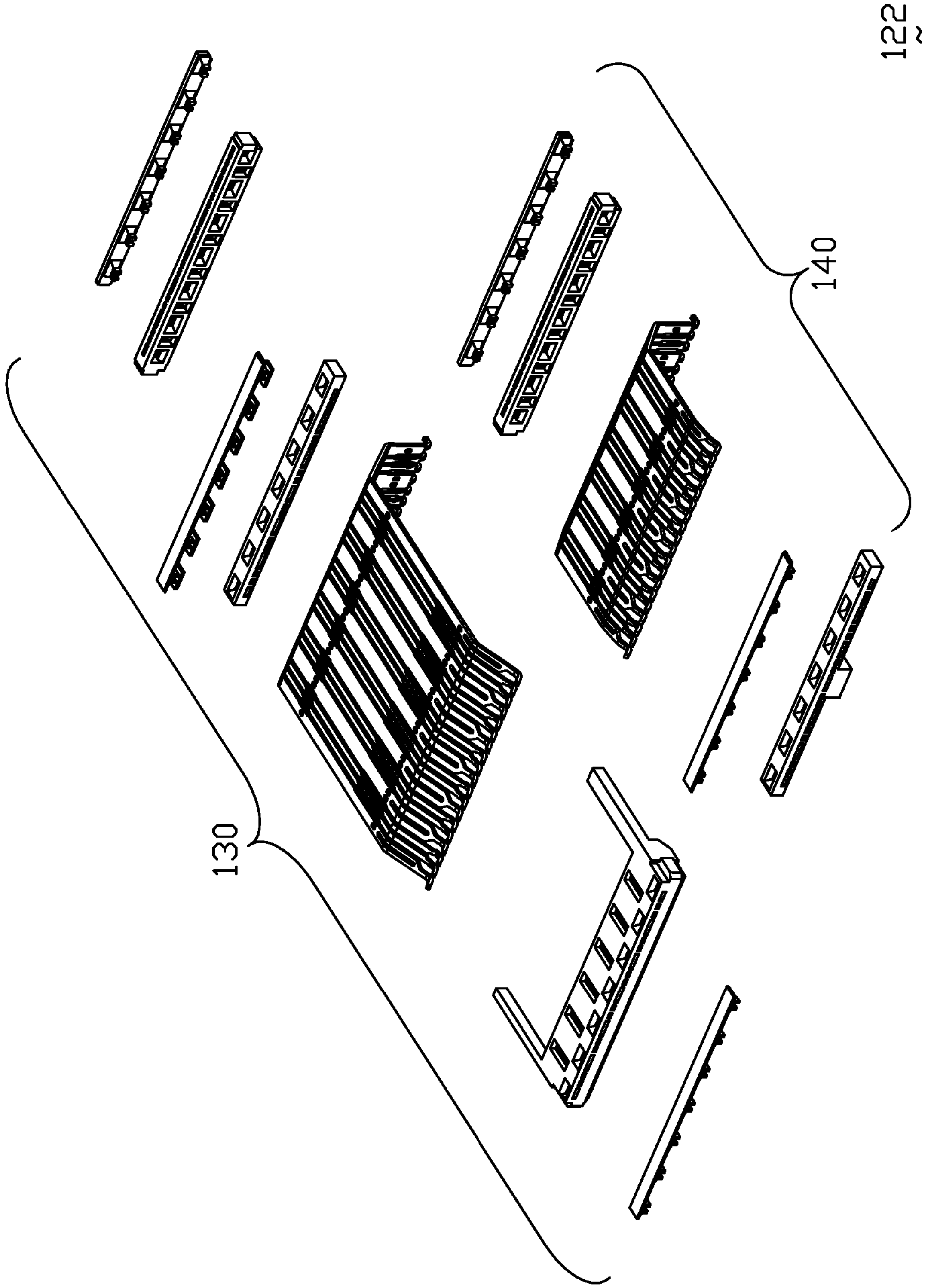
FIG. 18(A) is an exploded perspective view of the upper contact unit of the contact module of the electrical connector of FIG. 17(A)
Figure 18B:
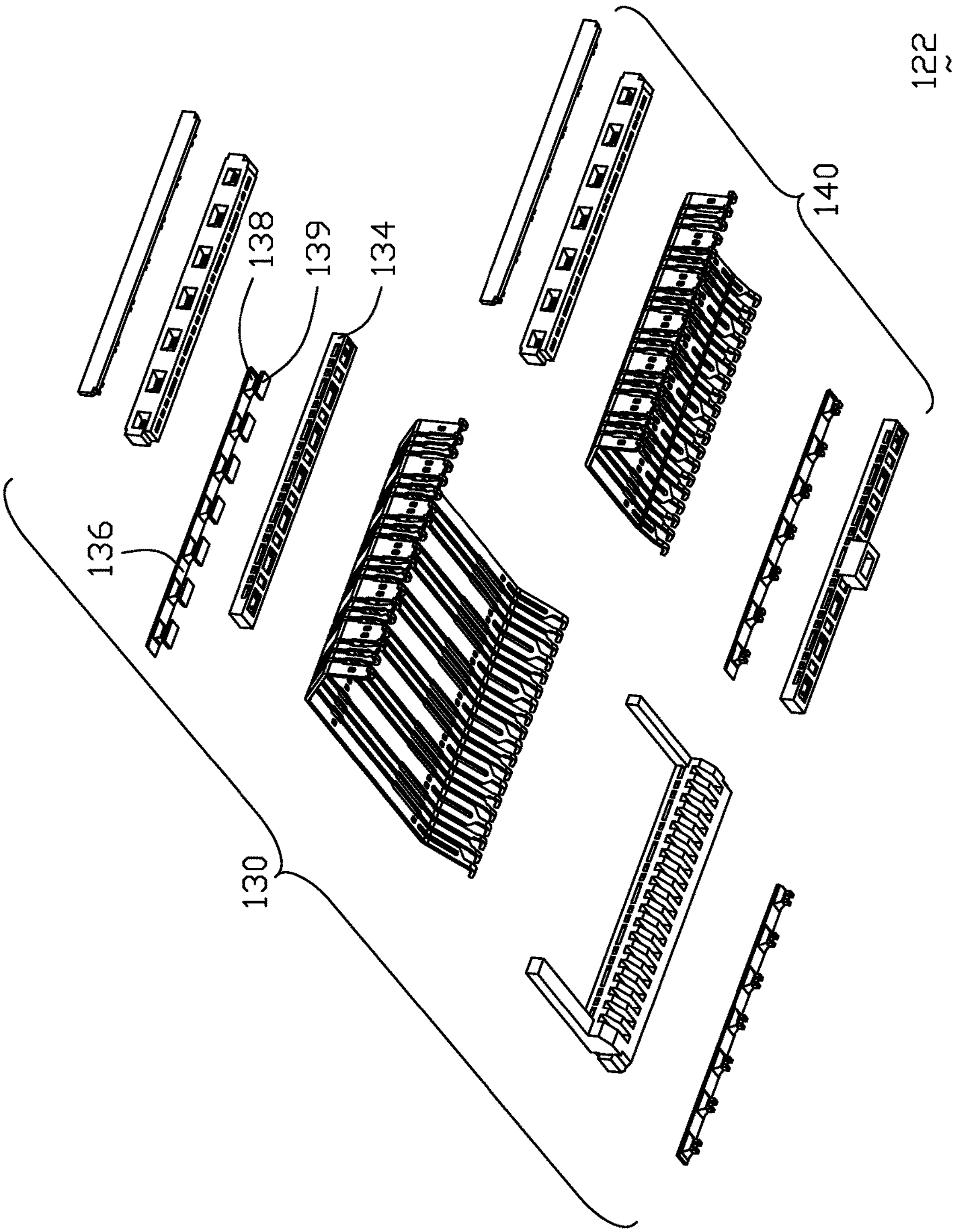
FIG. 18(B) is another exploded perspective view of the upper contact module of the electrical connector of FIG. 18(A)
Figure 19A:
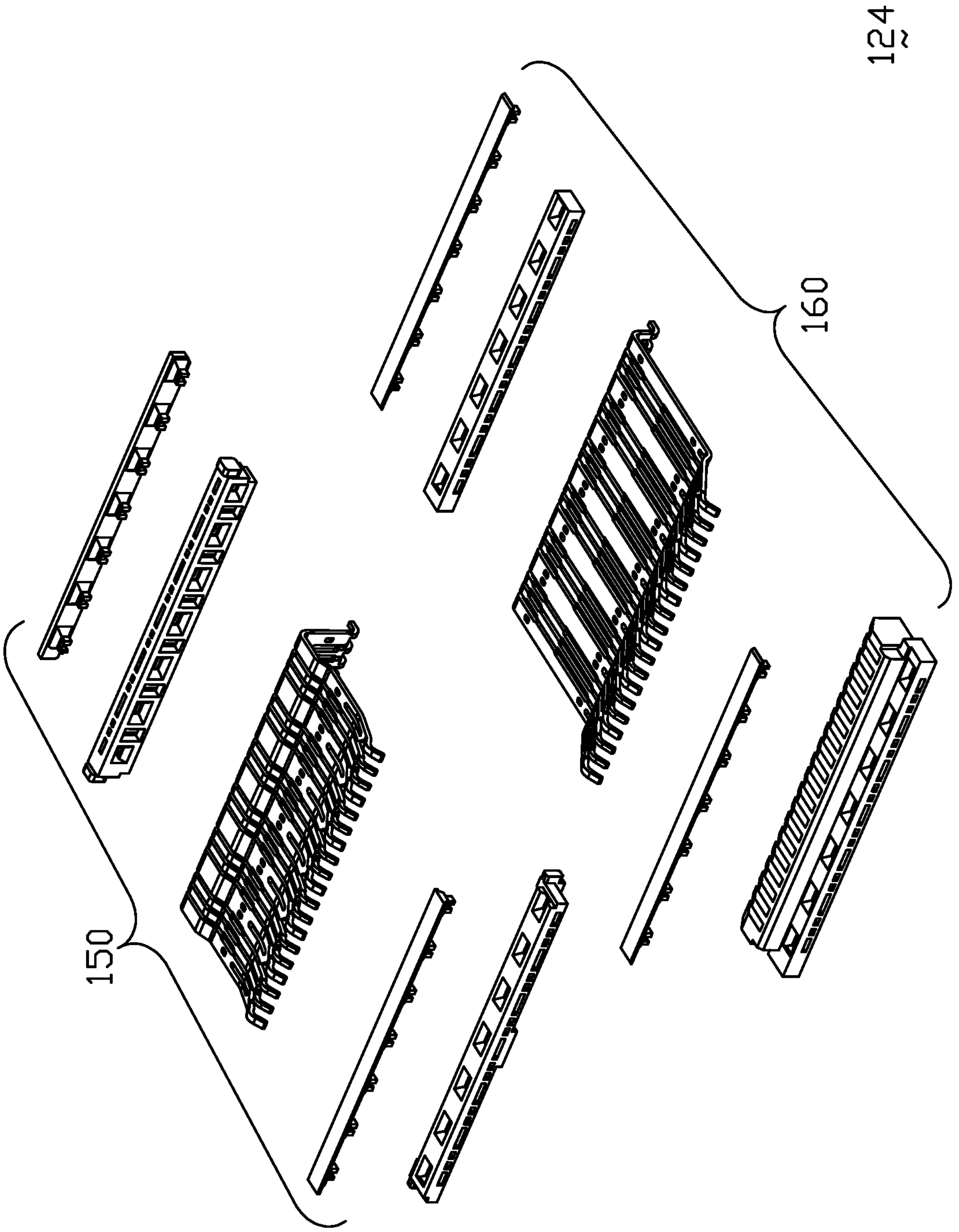
FIG. 19(A) is an exploded perspective view of the lower contact unit of the contact module of module of the electrical connector of FIG. 17(A)
Figure 19B:
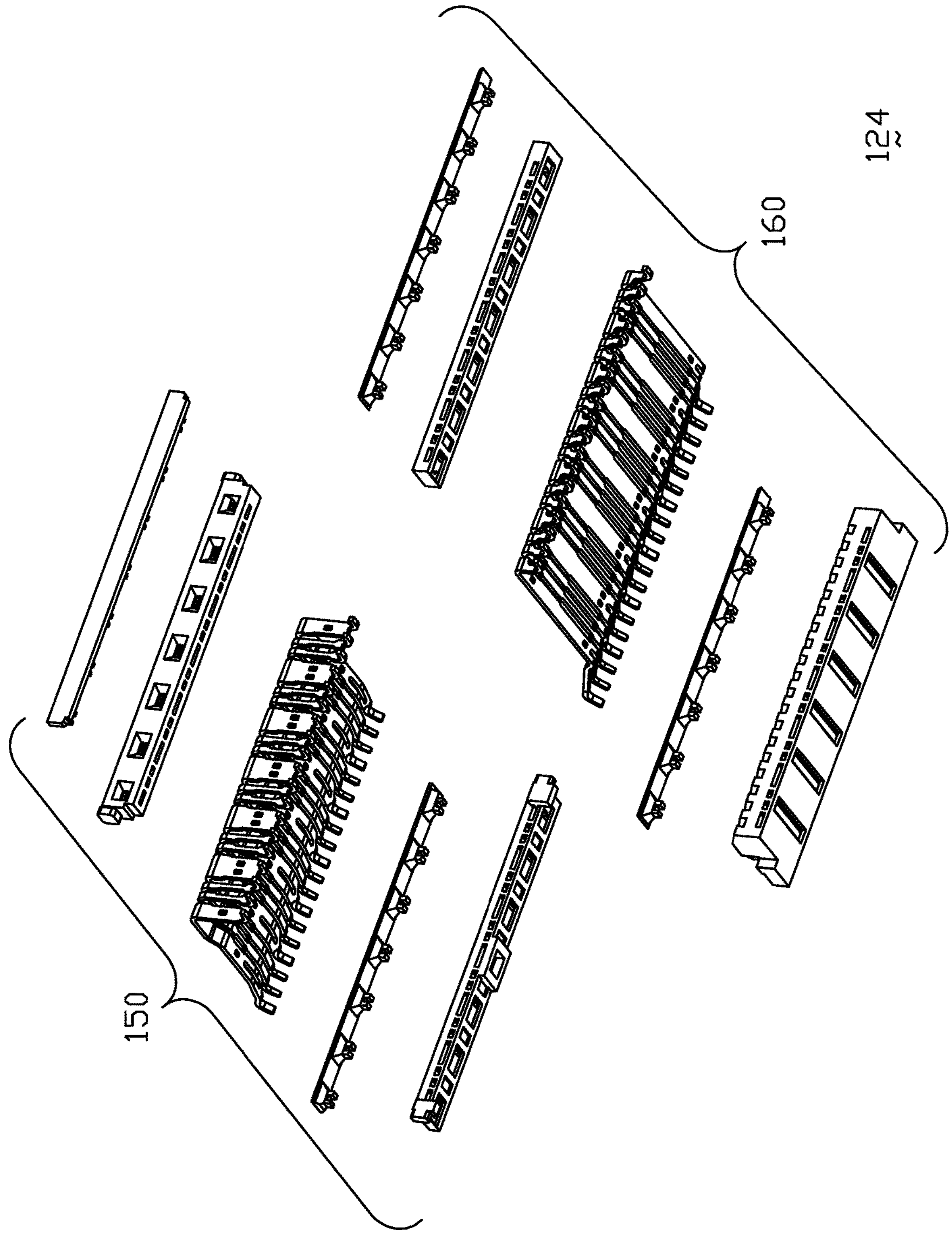
FIG. 19(B) is another exploded perspective view of the lower contact unit of the contact module of the electrical connector of FIG. 19(A)
Figure 20A:
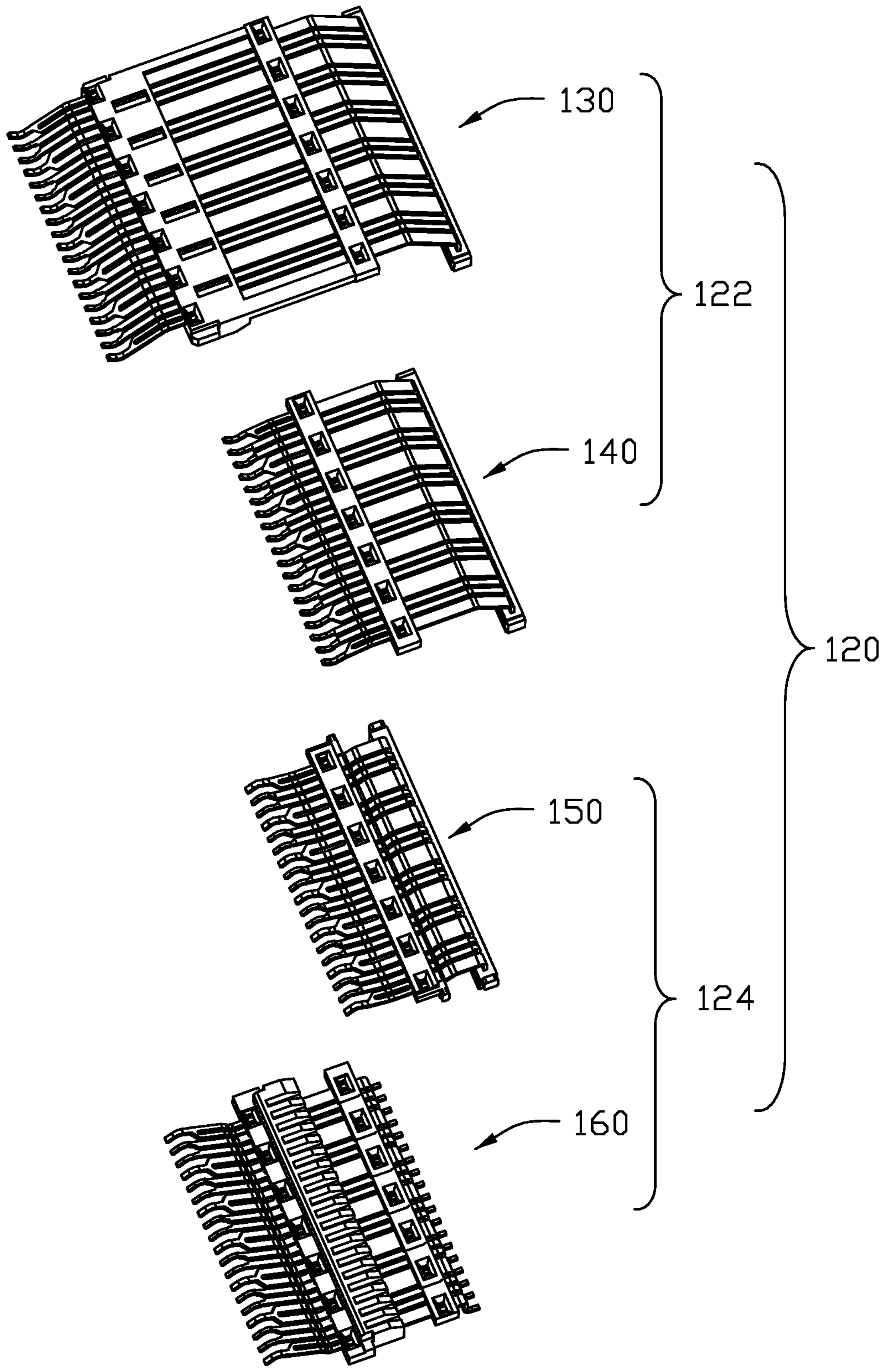
FIG. 20(A) is an exploded perspective view of the contact module of the electrical connector of FIG. 16(A) without showing the conductive secondary parts of the plastic tie bars.
Figure 20B:
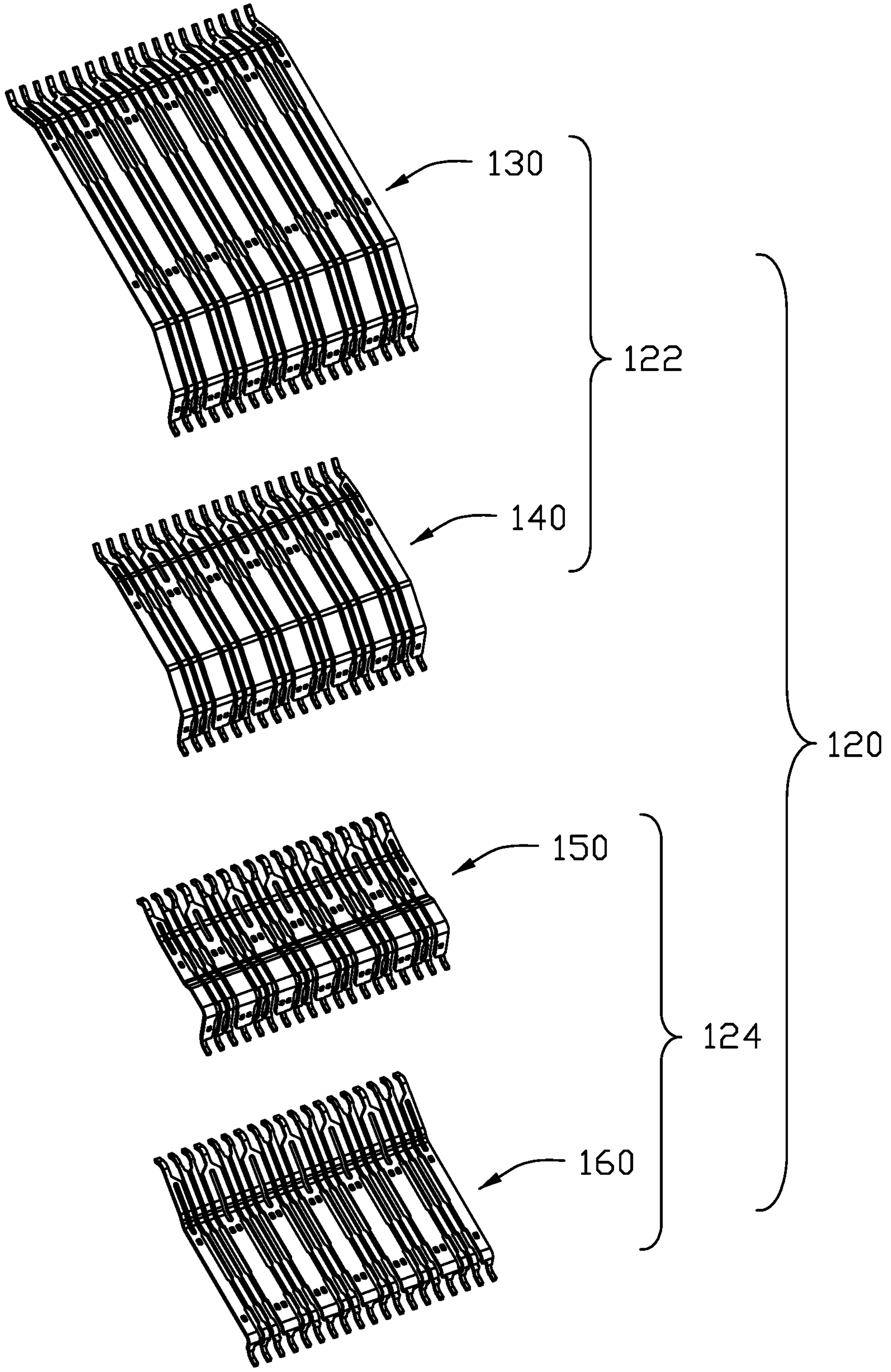
FIG. 20(B) is an exploded perspective view of the contact module of FIG. 20(A) without showing the plastic tie bars.
Figure 21A:
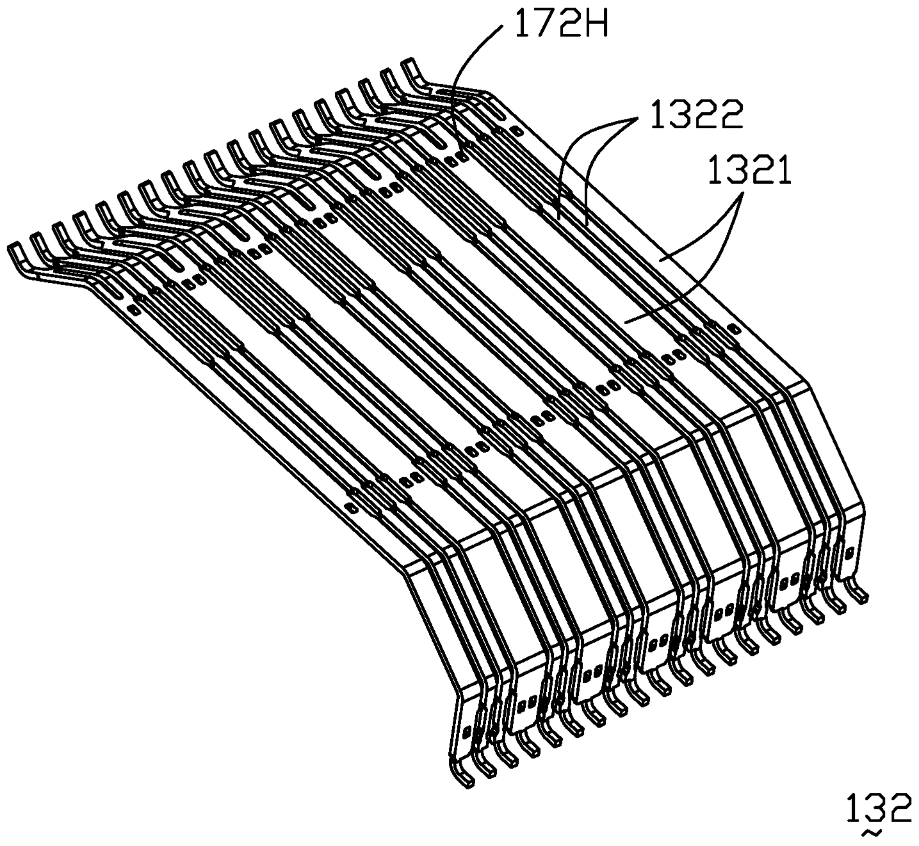
FIG. 21(A) is a perspective view of the contacts of the front/outer part of the upper contact unit of the contact module of the electrical connector of FIG. 13(A)
Figure 21B:
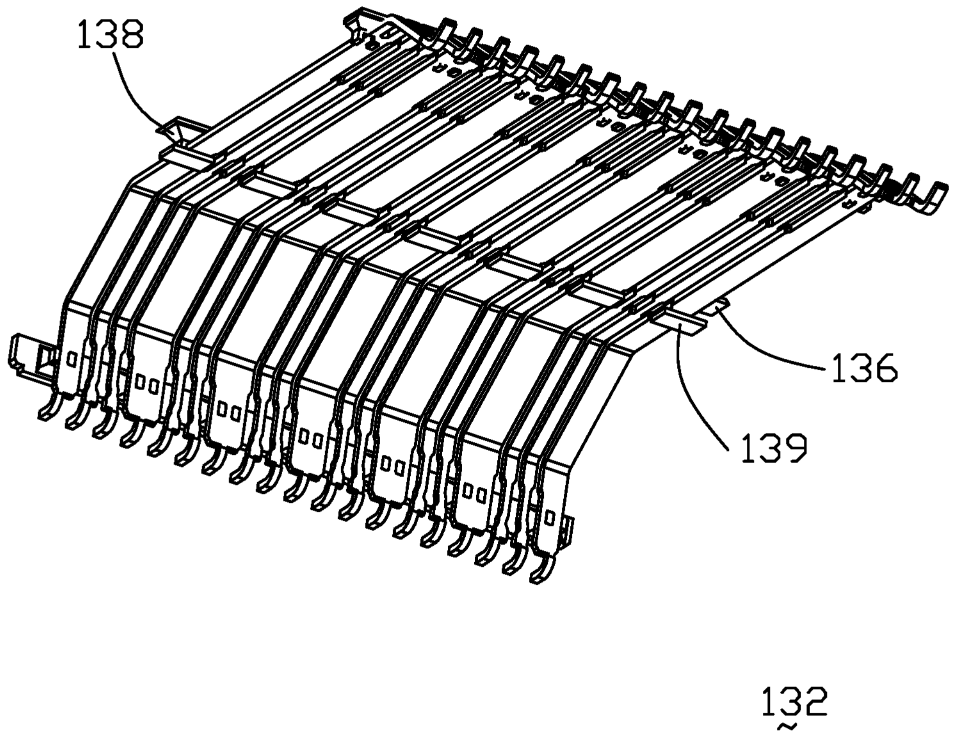
FIG. 21(B) is another perspective view of the upper contact unit of the contact module the electrical connector of FIG. 20(A) without showing the corresponding insulative primary part.
Figure 22:
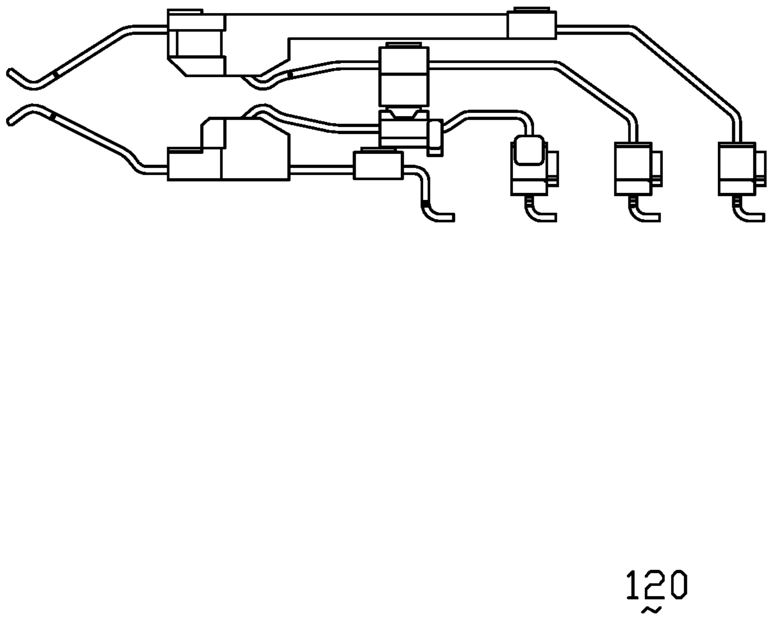
FIG. 22 is a side view of the contact module of the electrical connector of FIG. 13(A)
Figure 23A:
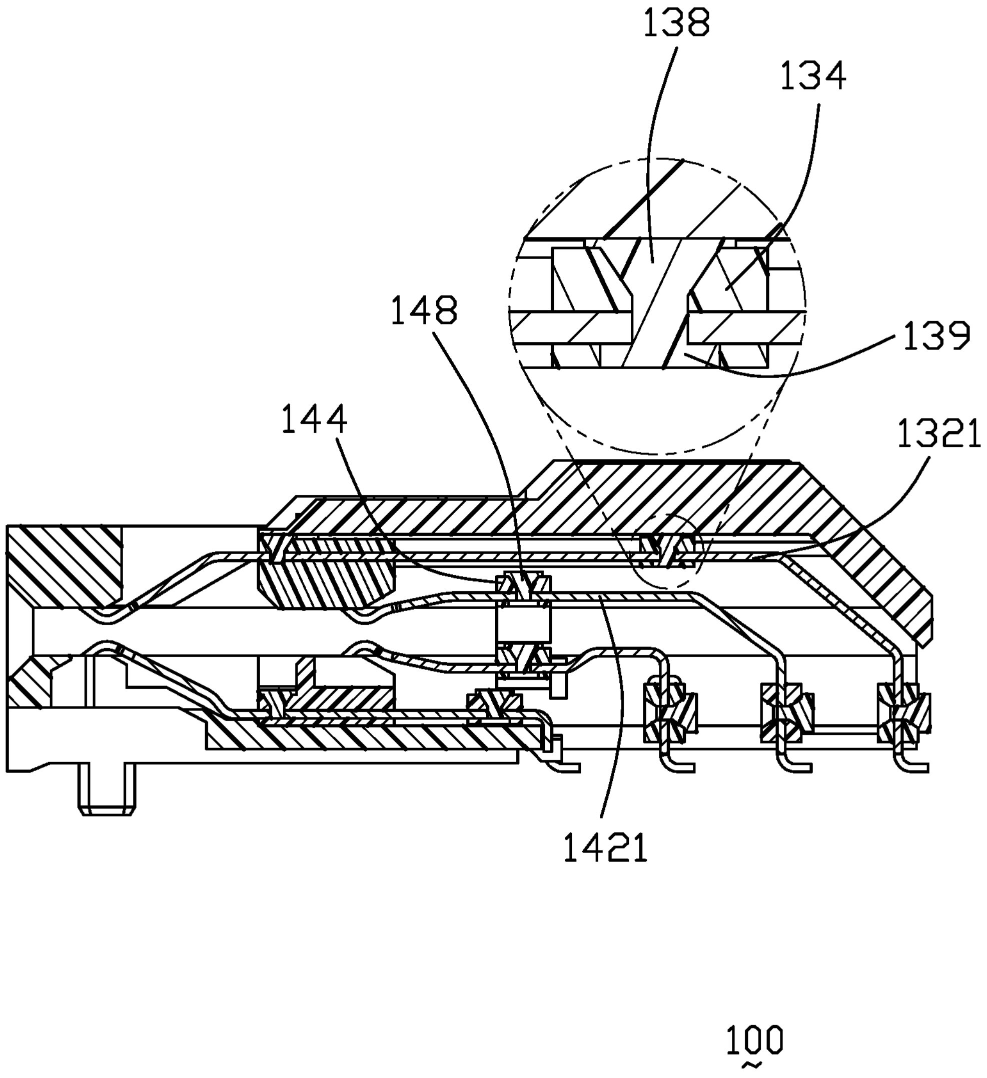
FIG. 23(A) is a cross-sectional view of the electrical connector of FIG. 13(A)
Figure 23B:
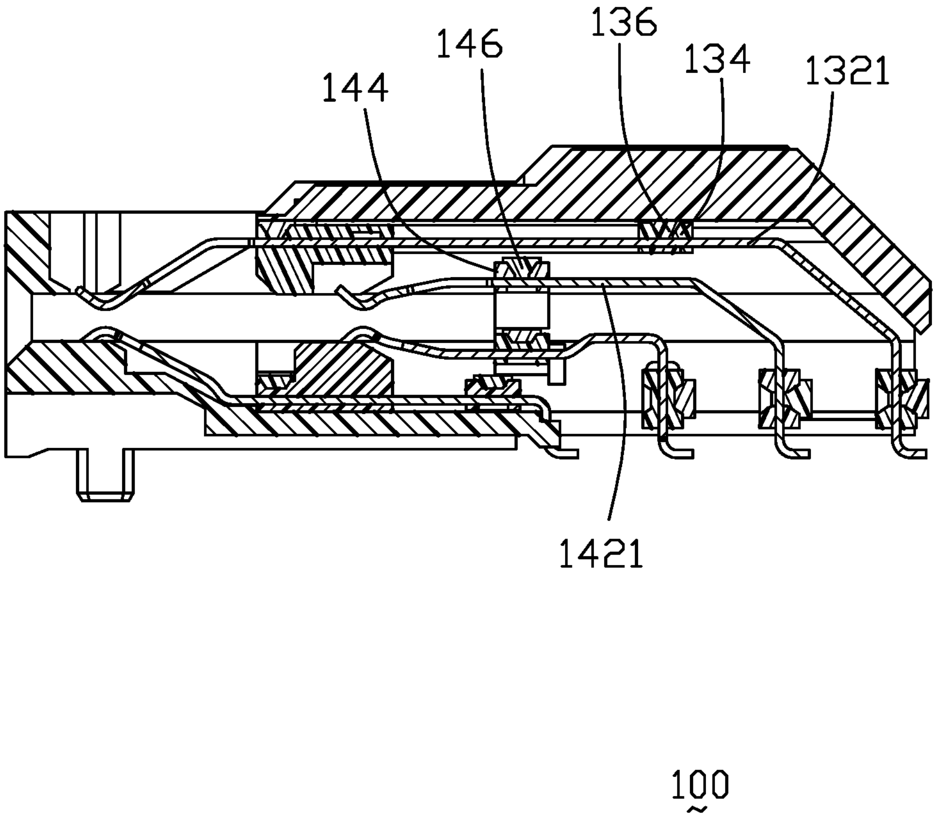
FIG. 23(B) is another cross-sectional view of the electrical connector of FIG. 13(A)
Figure 24:
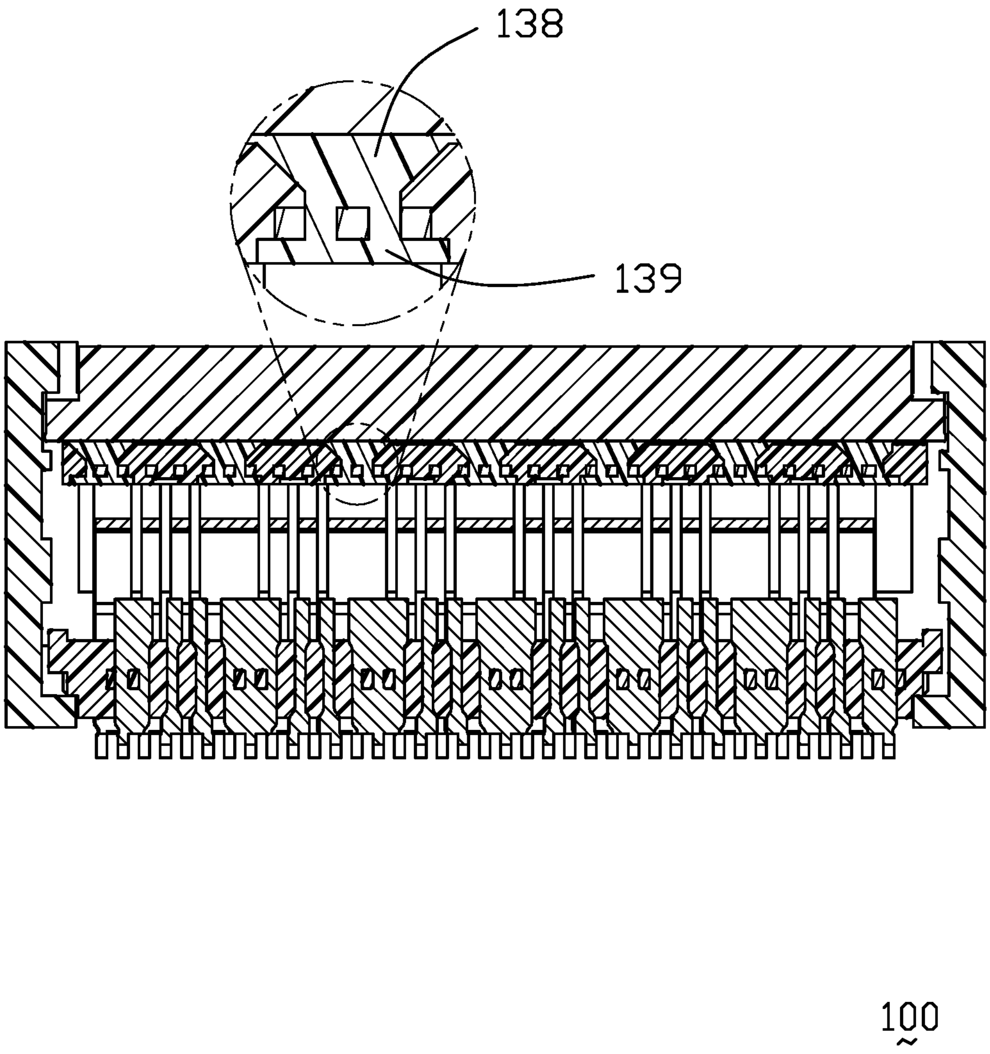
FIG. 24 is another cross-sectional view of the electrical connector of FIG. 13(A).

FIGS. 13(A)-24 show the second embodiment wherein all structures thereof are essentially same with those of the first embodiment of FIGS. 1(A)-12 except that each of the protrusions 138 further includes a plate 139 at the bottom end as shown in FIGS. 18(B) and 21(B) to fill the corresponding hole 134H which is empty in FIG. 11(A) of the first embodiment but being filled by the plate 139 as shown in FIGS. 23(A) and 24. The conductive secondary part 136 is formed in the hole 134H through the hole 172H to form the plate 139. Understandably, the plate 139 may enhance mechanical integral securement among the insulative primary part 134, the conductive secondary part 136 and the grounding contacts 1321.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A contact module for use within an insulative housing of an electrical connector, comprising: a plurality of contacts side by side arranged with each other along a transverse direction, each of the contacts including, along a front-to-back direction perpendicular to the transverse direction, a front resilient contacting section for mating with a mating connector;

a rear mounting section for mounting to a printed circuit board; and a retaining section therebetween to retain each of the contacts in the housing, said plurality of contacts including a plurality of differential-pair signal contacts and a plurality of grounding contacts alternately arranged with each other in the transverse direction, all the contacts being integrally formed within a plastic tie bar essentially including an insulative primary part and a conductive secondary part; wherein all of the plurality of contacts are integrally formed with the insulative primary part via a first insert-molding process, and only the grounding contacts are further integrally formed with the conductive secondary part; and the insulative primary part forms a plurality of recesses aligned with corresponding grounding contacts in a vertical direction perpendicular to both the transverse direction and the front-to-back direction, and the recesses are filled with the conductive secondary part.

2. The contact module as claimed in claim 1, wherein the plastic tie bar extends in the transverse direction.

3. The contact module as claimed in claim 2, wherein both the insulative primary part and the conductive secondary part extend in the transverse direction.

4. The contact module as claimed in claim 1, wherein the conductive secondary part is integrally formed with the insulative primary part.

5. The contact module as claimed in claim 1, wherein each grounding contact forms a hole aligned with the corresponding recess in the vertical direction to receive the conductive secondary part.

6. The contact module as claimed in claim 5, wherein the insulative primary part further forms another recess on an opposite side of each grounding contact under a corresponding hole in the vertical direction so as to receive a plate of the conductive secondary part therein.

7. The contact module as claimed in claim 6, wherein said another recess has a funnel like configuration.

8. An electrical connector comprising:

an insulative housing; and a contact module received within the insulative housing, the contact module including an upper contact unit and a lower contact unit stacked with each other, each of the upper contact unit and the lower contact unit including a front/outer contact part and a rear/inner contact part each including a plurality of side by side arranged contacts integrally formed with a plurality of plastic tie bars at different positions via insert-molding, the contacts including a plurality of differential pair signal contacts and a plurality of grounding contacts alternately arranged with each other along a transverse direction, wherein each plastic tie bar includes an insulative primary part integrally formed with all contacts via a first insert-molding process, and a conductive secondary part integrally formed with the primary part and the grounding contacts via a second insert-molding process after the first insert-molding process.

9. The electrical connector as claimed in claim 8, wherein, in the upper contact unit and the lower contact unit, the front/outer contact part of the upper contact unit has the longest dimension in a front-to-rear direction.

10. The electrical connector as claimed in claim 9, wherein the number of the plastic tie bars formed on the front/outer contact part of the upper contact unit is more than the number of plastic tie bars formed on other contact parts.

11. The electrical connector as claimed in claim 8, wherein each of the contacts includes a front resilient contacting section for mating with a mating connector, a rear mounting section for mounting to a printed circuit board, and a retaining section therebetween, the retaining section includes a horizontal section, a vertical section and an oblique section therebetween, two plastic tie bars are integrally formed upon the horizontal section, one plastic tie bar is integrally formed upon the vertical section, and the plastic tie bars formed on the horizontal section of the front/outer contact part of the upper contact unit are connected together.

12. The electrical connector as claimed in claim 11, wherein the two sides of the insulative primary part of the two plastic tie bars arranged in the horizontal section are connected together, but the conductive secondary part is not connected together.

13. The electrical connector as claimed in claim 12, wherein the insulative primary part of the plastic tie bar at the front of the horizontal section includes a main body and two connecting portions extending backward on corresponding sides of the main body for connecting with the plastic tie bars at the rear thereof.

14. The electrical connector as claimed in claim 13, wherein the connecting portion is not molded with any contact.

15. The electrical connector as claimed in claim 13, wherein a width of the grounding contact where the opening is provided is greater than a width of the contacting section.

16. The electrical connector as claimed in claim 8, wherein each of the contact includes a cantilever arm extending forward, the front deflectable resilient contacting section is located at the front of the cantilever arm, and the cantilever arm of each grounding contact is provided with an opening.

17. The electrical connector as claimed in claim 16, wherein the opening is not covered by the plastic tie bars.

* * * * *